(12) United States Patent
Seger, Jr. et al.

(10) Patent No.: US 11,733,818 B2
(45) Date of Patent: Aug. 22, 2023

(54) IDENTIFYING CAPACITIVELY COUPLED DEVICES

(71) Applicant: SIGMASENSE, LLC., Wilmington, DE (US)

(72) Inventors: Richard Stuart Seger, Jr., Belton, TX (US); Michael Shawn Gray, Dripping Springs, TX (US); Daniel Keith Van Ostrand, Leander, TX (US); Patrick Troy Gray, Cedar Park, TX (US); Timothy W. Markison, Mesa, AZ (US)

(73) Assignee: SIGMASENSE, LLC., Wilmington, DE (US)

( * ) Notice: Subject to any disclaimer, the term of this patent is extended or adjusted under 35 U.S.C. 154(b) by 0 days.

(21) Appl. No.: 17/305,973

(22) Filed: Jul. 19, 2021

(65) Prior Publication Data
US 2023/0019284 A1 Jan. 19, 2023

(51) Int. Cl.
*G06F 3/044* (2006.01)
*G06F 3/041* (2006.01)

(52) U.S. Cl.
CPC .......... *G06F 3/0446* (2019.05); *G06F 3/0418* (2013.01); *G06F 3/04162* (2019.05); *G06F 3/04166* (2019.05)

(58) Field of Classification Search
CPC ............... G06F 3/0446; G06F 3/04166; G06F 3/04162; G06F 3/0418
See application file for complete search history.

(56) References Cited

U.S. PATENT DOCUMENTS

| | | |
|---|---|---|
| 6,218,972 B1 | 4/2001 | Groshong |
| 6,665,013 B1 | 12/2003 | Fossum et al. |
| 7,528,755 B2 | 5/2009 | Hammerschmidt |
| 8,031,094 B2 | 10/2011 | Hotelling |
| 8,089,289 B1 | 1/2012 | Kremin et al. |
| 8,279,180 B2 | 10/2012 | Hotelling et al. |
| 8,547,114 B2 | 10/2013 | Kremin |
| 8,625,726 B2 | 1/2014 | Kuan |
| 9,201,547 B2 | 12/2015 | Elias |

(Continued)

OTHER PUBLICATIONS

Baker; How delta-sigma ADCs work. Part 1; Analog Applications Journal; Oct. 1, 2011; 6 pgs.

(Continued)

*Primary Examiner* — Lisa S Landis
(74) *Attorney, Agent, or Firm* — Garlick & Markison; Edward J. Marshall

(57) ABSTRACT

A touch-sensitive panel includes row electrodes, column electrodes, and drive-sense circuits coupled to the row electrodes and the column electrodes. The drive-sense circuits detect changes in impedances of the row and column electrodes. The touch-sensitive panel also includes analog-to-digital converters coupled to outputs of the drive-sense circuits, and a processing module coupled to the drive-sense circuits via the analog-to-digital converters. The processing module, the analog-to-digital converters, and the plurality of drive-sense circuits cooperate to sense an information signal capacitively coupled to the row and column electrodes, and to extract data from the information signal to identify a device that produced the information signal.

20 Claims, 27 Drawing Sheets digital data formats

(56) References Cited

U.S. PATENT DOCUMENTS

| | | |
|---|---|---|
| 2011/0063154 A1 | 3/2011 | Hotelling et al. |
| 2013/0278447 A1 | 10/2013 | Kremin |
| 2016/0188049 A1 | 6/2016 | Yang et al. |
| 2018/0275824 A1 | 9/2018 | Li |
| 2020/0026369 A1* | 1/2020 | Hisano ............... G06F 3/04162 |
| 2020/0089382 A1* | 3/2020 | Gray ................... G06F 3/0416 |

OTHER PUBLICATIONS

Brian Pisani, "Digital Filter Types in Delta-Sigma ADCs", Application Report SBAA230, May 2017, pp. 1-8, Texas Instruments Incorporated, Dallas, Texas.

* cited by examiner data communication system 10 data communication system 10 computing device 14 drive-sense circuit 28 power supply unit 92

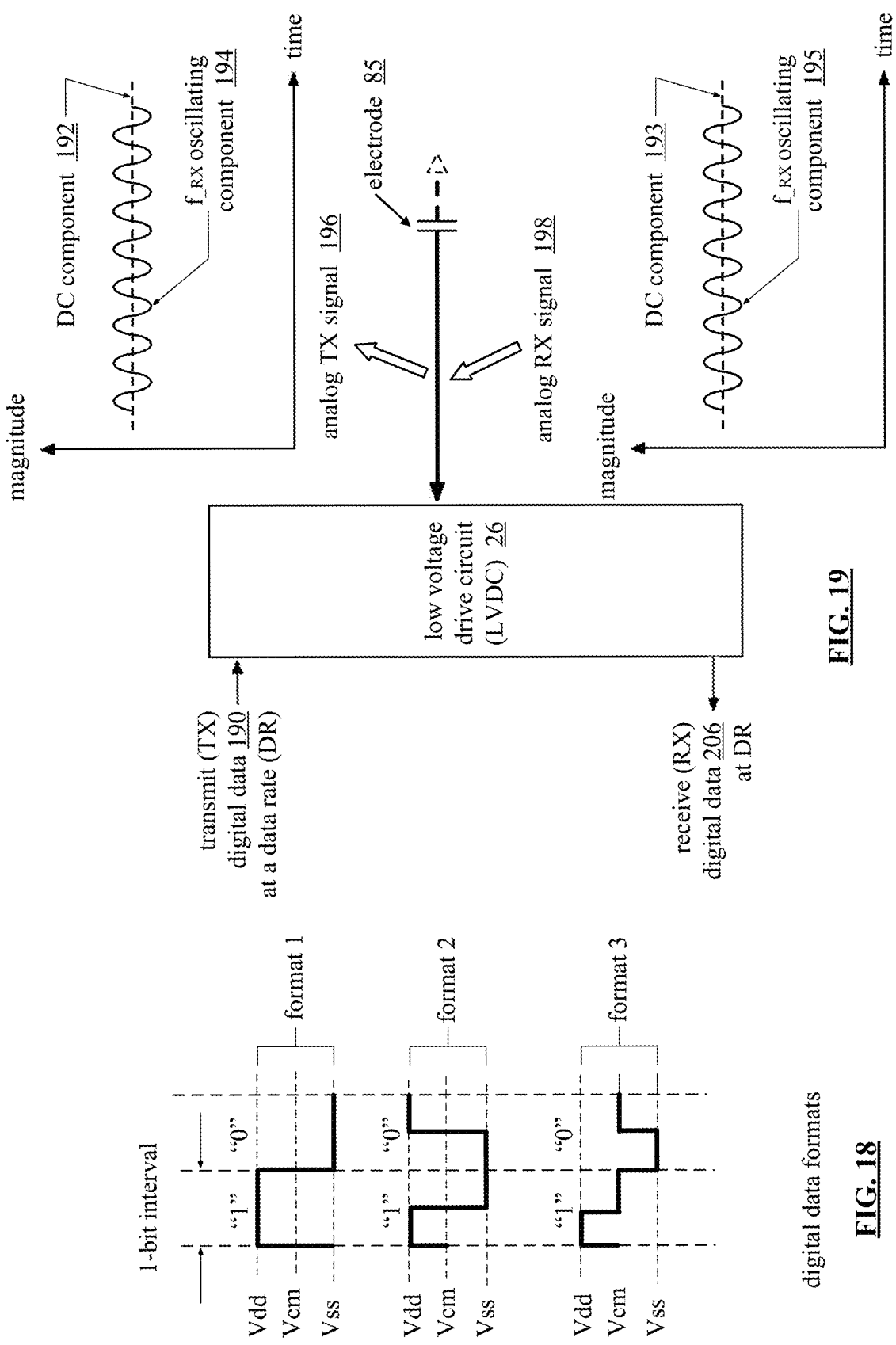

drive sense circuit 28 drive sense circuit 28

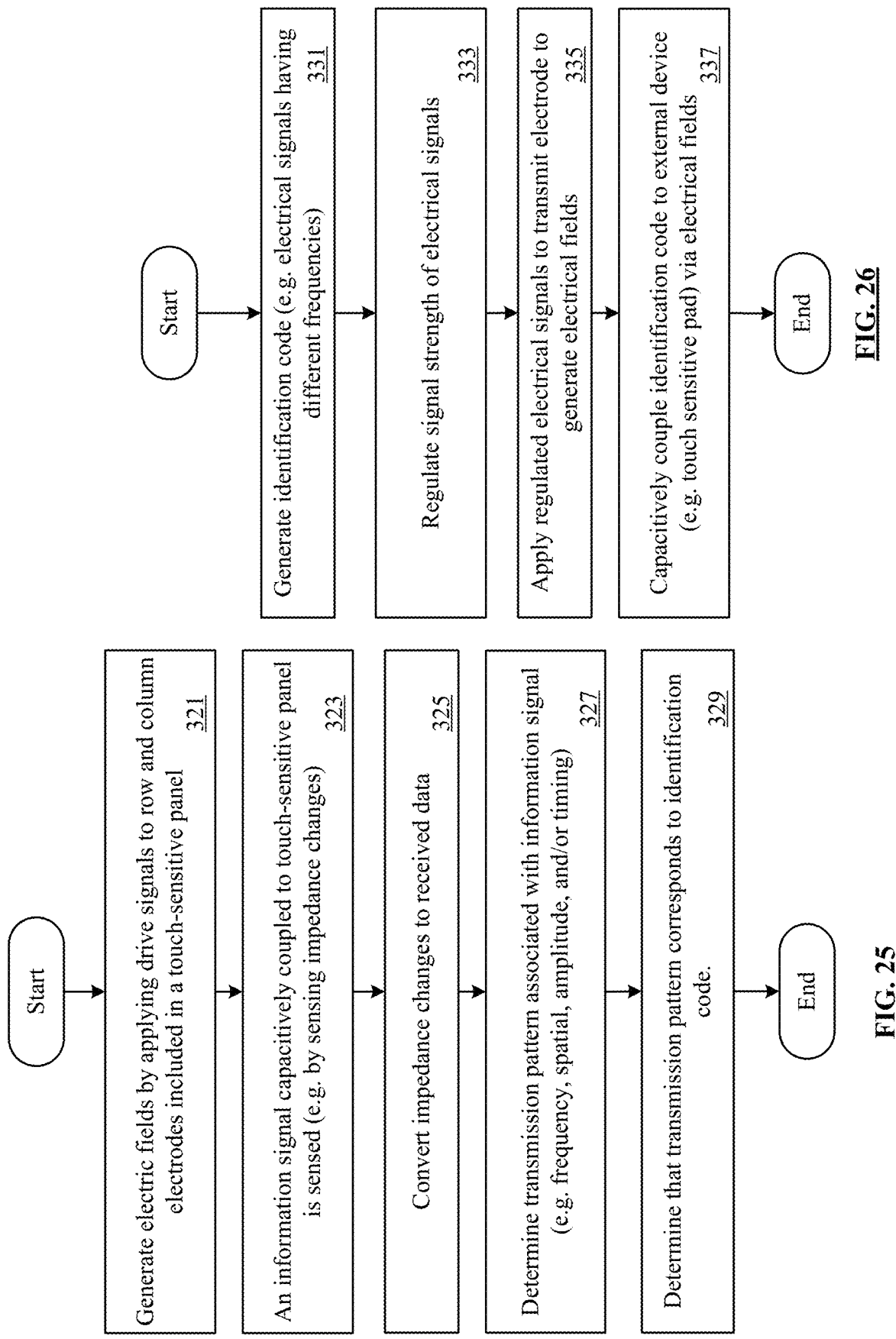

IDENTIFYING CAPACITIVELY COUPLED DEVICES

CROSS-REFERENCE TO RELATED APPLICATIONS

Not Applicable.

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not Applicable.

BACKGROUND OF THE INVENTION

Technical Field

This invention relates generally to data communication systems and more particularly to sending and receiving data via capacitive coupling.

Description of Related Art

Data communication involves sending data from one device to another device via a communication medium (e.g., a wire, a trace, a twisted pair, a coaxial cable, air, etc.). The devices range from dies within an integrated circuit (IC), to ICs on a printed circuit board (PCB), to PCBs within a computer, to computers, to networks of computers, and so on.

Data is communicated via a wired and/or a wireless connection and is done so in accordance with a data communication protocol. Data communication protocols dictate how the data is to be formatted, encoded/decoded, transmitted, and received. For example, a wireless data communication protocol such as IEEE 802.11 dictates how wireless communications are to be done via a wireless local area network. As another example, Sony/Philips Digital Interface Format (SPDIF) dictates how digital audio signals are transmitted and received. As yet another example, Inter-Integrated Circuit (I2C) is a two-wire serial protocol to connect devices such as microcontrollers, digital to analog converters, analog to digital converters, peripheral devices to a computer, and so on.

Wireless communication is frequently performed by modulating digital data with an analog carrier signal and transmitted/received via a modulated radio frequency (RF) signal. Typical amplitude modulated (AM) or frequency modulated (FM) radio signals are two common types of wireless communications that use RF signals to transmit data over significant distances. Amateur (ham) radio operators can, under proper conditions, talk to other ham radio operators on distant continents.

Another type of wireless communication, which is generally useful only at very short distances of between about 0-2 cm is referred to as Near-Field communication (NFC). NFC devices use inductive coupling to transfer data. Devices using NFC include credit cards, radio frequency ID tags, and the like.

For other data communications, rather than using RF frequencies, the digital data is transmitted "as is" via a wire or metal trace on a PCB. Regardless of the data communication protocol, digital data is in binary form where a logic "1" value is represented by a voltage that is at least 90% of the positive rail voltage and a logic "0" is represented by a voltage it is at most 10% of the negative rail voltage.

BRIEF DESCRIPTION OF THE SEVERAL VIEWS OF THE DRAWING(S)

FIG. 18 is a schematic block diagram of examples of digital data formats in accordance with embodiments of the present disclosure;

FIG. 19 is a functional diagram of an embodiment of an LVDC in accordance with embodiments of the present disclosure;

FIG. 25 is a flowchart illustrating use of transmission patterns to extract an identification code from a capacitively-coupled information signal in accordance with embodiments of the present disclosure;

FIG. 26 is a flowchart illustrating a method of capacitively communicating between an identifying device and a touch-sensitive panel in accordance with embodiments of the present disclosure;

DETAILED DESCRIPTION

Figure 1:
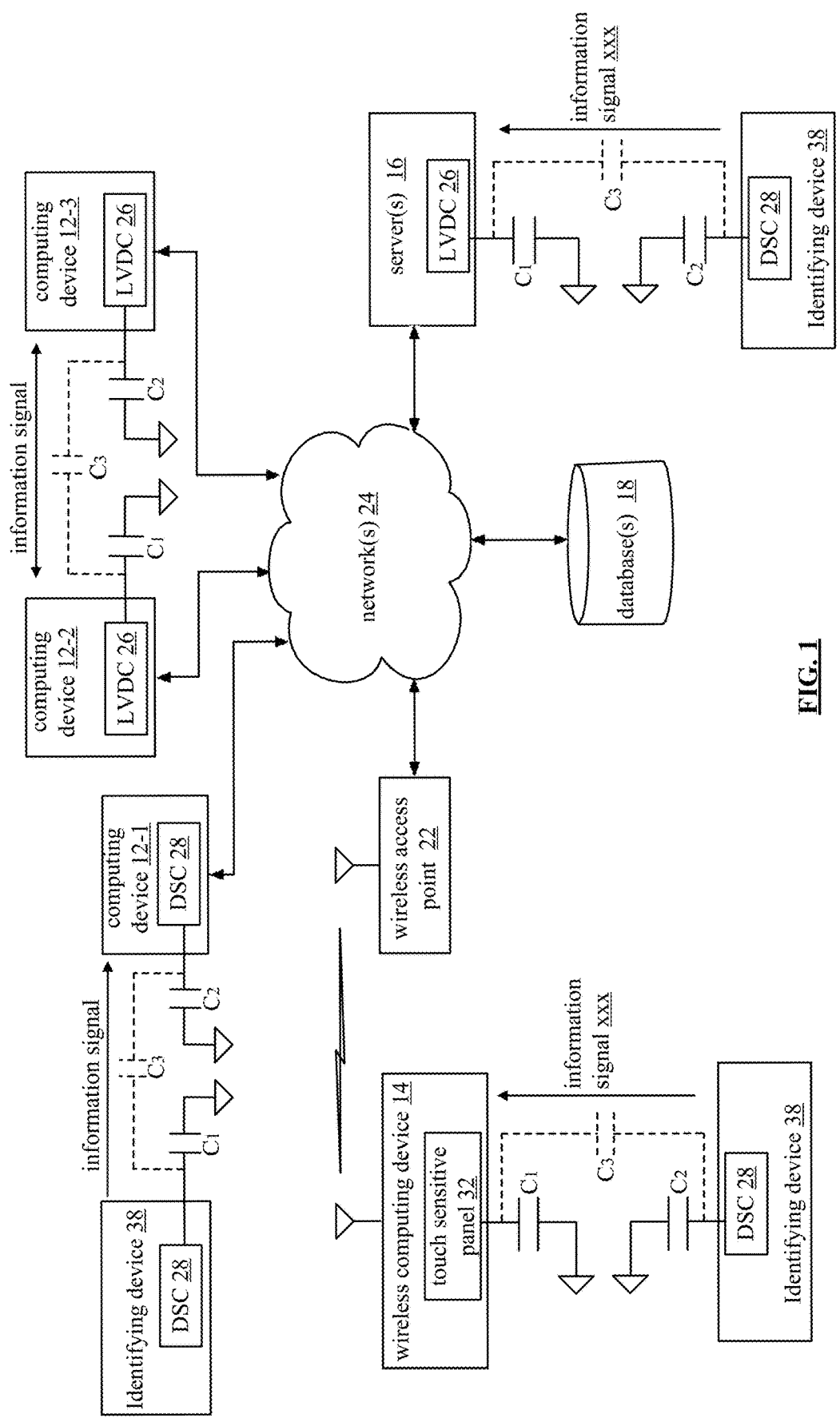
FIG. 1 is a schematic block diagram of an embodiment of a data communication system in accordance with embodiments of the present disclosure.

FIG. 1 is a schematic block diagram of an embodiment of a data communication system 10 that includes a plurality of computing devices 12, a wireless computing device 14, one or more servers 16, one or more databases 18, one or more networks 24, one or more wireless access points 22, and a plurality of identifying devices 38. Embodiments of computing devices 12 and 14 are similar in construct and/or functionality with a difference being that computing devices 12 couple to the network(s) 24 via a wired network card and the wireless communication devices 14 coupled to the network(s) via a radio frequency wireless connection. In an embodiment, a computing device can have both a wired network card and a wireless network card such that it is both a computing device 12 and a wireless computing device 14. In addition, any or all of the computing devices, wireless computing device, access point, or server 16 can include circuitry that allows data to be exchange with other computing devices via capacitive-coupling.

For example, computing device 12-1 includes a drive-sense circuit (DSC) 28 that can be used to capacitively couple an information signal generated by another DSC 28 included in identifying device 38. The information signal is generated by passing one or more signals having one or more frequencies through an electrode illustrated as capacitor C1. The information signal is coupled to an electrode illustrated as capacitor C2, via a capacitive path illustrated as capacitor C3, when the identifying device or a human in physical contact with the identifying device, comes within physical proximity of computing device 12-1. When the information signal is capacitively coupled to C2 via C3 the signal causes a change in the current flowing through C2. The changes in current flowing through C2 cause changes in an impedance associated with C2, and those changes are processed to extract data from the information signal.

In another example, computing device 12-2 includes a low voltage drive circuit (LVDC) 26, which can be used to capacitively couple an information signal generated by computing device 12-2 using another LVDC 26. The capacitive coupling mechanism is the same as described with respect to computing device 12-1. In this example, however, the information signal can be exchanged either from computing device 12-2 to computing device 12-3, or from computing device 12-3 to computing device 12-2.

In yet another example, wireless computing device 14 includes touch-sensitive panel 32. An information signal, for example an identification code, is generated by an identifying device 38 including a DSC 28, and is capacitively coupled via C3 to the touch-sensitive panel 32 included in wireless computing device 14. The capacitive coupling mechanism is the same as in the previous examples.

In a further embodiment, server 16 includes an LVDC 26. An information signal, for example an access code, is generated by an identifying device 38 including a DSC 28, and is capacitively coupled via C3 to the LVDC 26 included in server 16. The capacitive coupling mechanism is the same as already described, and as explained further with respect to subsequent figures.

A computing device 12 and/or 14 may be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment.

A server 16 is a special type of computing device that is optimized for processing large amounts of data requests in parallel. A server 16 includes similar components to that of the computing devices 12 and/or 14 with more robust processing modules, more main memory, and/or more hard drive memory (e.g., solid state, hard drives, etc.). Further, a server 16 is typically accessed remotely; as such it does not generally include user input devices and/or user output devices. However, in some embodiments, server 16 can include a touch-sensitive panel that allows capacitive coupling of an identifier or other information, for example an identification or access code used to control access to the server. In addition, an embodiment of a server is a stand-alone separate computing device and/or may be a cloud computing device.

A database 18 is a special type of computing device that is optimized for large scale data storage and retrieval. A database 18 includes similar components to that of the computing devices 12 and/or 14 with more hard drive memory (e.g., solid state, hard drives, etc.) and potentially with more processing modules and/or main memory. Further, a database 18 is typically accessed remotely; as such it does not generally include user input devices and/or user output devices. In addition, an embodiment of a database 18 is a standalone separate computing device and/or may be a cloud computing device.

The network(s) 24 includes one or more local area networks (LAN) and/or one or more wide area networks (WAN), which may be a public network and/or a private network. A LAN may be a wireless-LAN (e.g., Wi-Fi access point, Bluetooth, ZigBee, etc.) and/or a wired LAN (e.g., Firewire, Ethernet, etc.). A WAN may be a wired and/or wireless WAN. For example, a LAN is a personal home or business's wireless network, and a WAN is the Internet, cellular telephone infrastructure, and/or satellite communication infrastructure.

Figure 2:
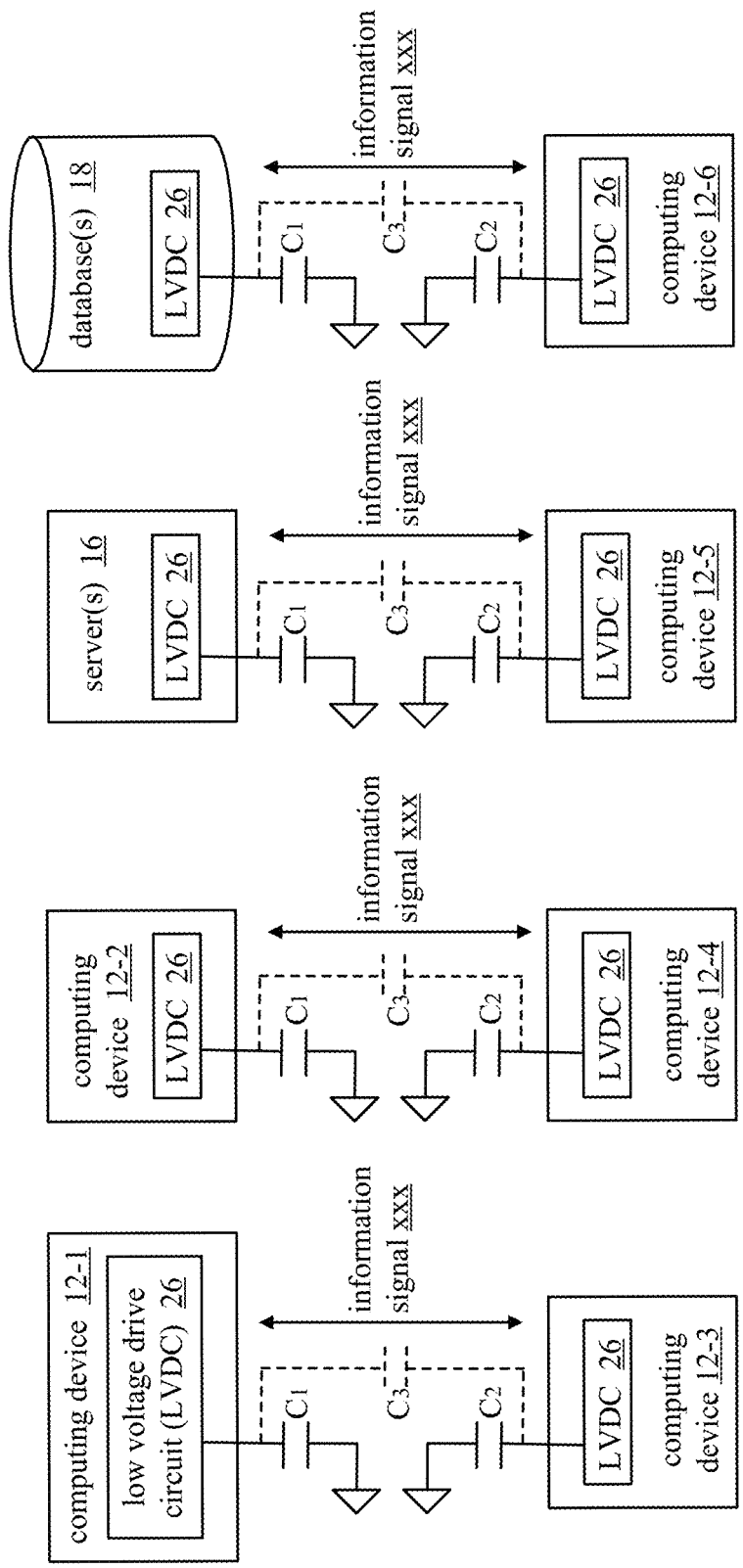
FIG. 2 is a schematic block diagram of another embodiment of a data communication system in accordance with embodiments of the present disclosure.

FIG. 2 is a schematic block diagram of another embodiment of a data communication system 10 that includes the computing devices 12, the server 16, and the database 18 coupled to each other via electrodes 85, which are illustrated as capacitors. In practice, however, the electrodes 85 act as plates of an air-dielectric capacitor. Each device 12-$x$, 16, and 18 includes one or more LVDCs 26 that work in conjunction with the electrodes 85 for communicating data capacitively.

An LVDC 26 functions to convert transmit digital data 212 (FIG. 20) from its host device into an information signal that is capacitively coupled to another host device a path including C3. As an example, a host device is a computing device, a server, or a database. As another example, a host device is an interface included in one the computing device, the server, or the database. In various embodiments discussed herein, host device that transmits an information signal representing an identifier, or identification code, is referred to as an identifying device. A host device that receives an information signal can be a stand-alone touch-sensitive panel with or without display capabilities, or a device that includes or is communicatively coupled to a touch-sensitive panel.

The LVDC 26 of one host device functions to generate the information signal, which represents the transmit digital data 212 (FIG. 20) to have an oscillating component at one or more frequencies. The LVDC 26 of another host device functions to convert variations in a sensed electric field caused by receipt of the information signal, into received digital data that is provided to its host. An LVDC 26 is capable of communicating data with one or more other LVDCs using a plurality of frequencies. Each frequency, or combination of frequencies, supports a conveyance of data.

Figure 3:
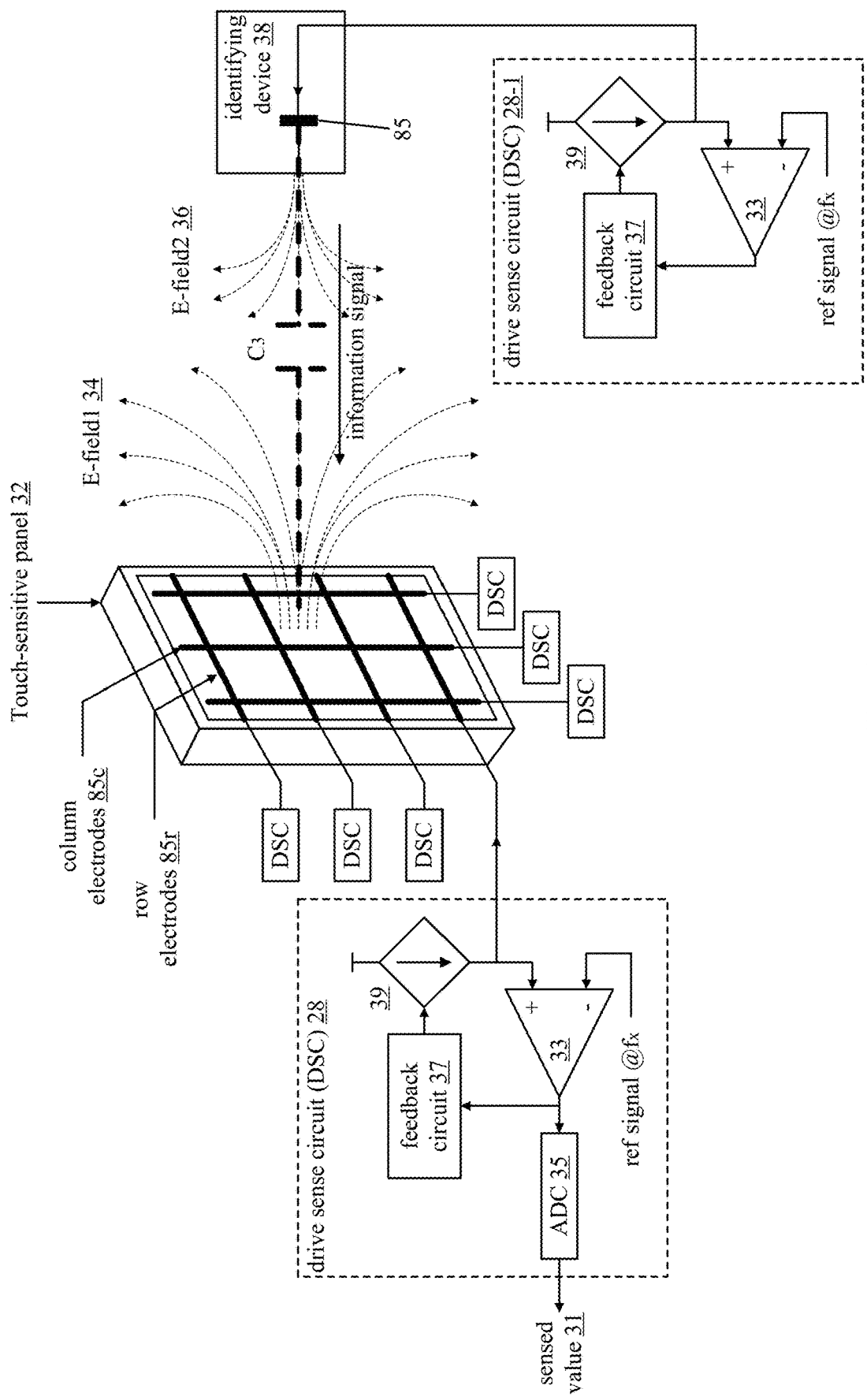
FIG. 3 is a block diagram illustrating a touch-sensitive panel including multiple drive-sense circuits capacitively coupled to an identifying device in accordance with embodiments of the present disclosure.

FIG. 3 is a block diagram illustrating a touch-sensitive panel 32 including multiple drive-sense circuits 28 capacitively coupled to an identifying device 38 via electric fields E-field1 34 and E-field2 36. To receive a capacitively-coupled information signal from identifying device 38, touch-sensitive panel 32 generates E-field1 34 by applying sense signals to column electrodes 85$c$ and/or row electrodes 85$r$. When E-field1 34 is generated by sense signals, it is referred to as a sense electric field, a sensing field, or some variation thereof. In this example, the row electrodes 85$r$ and column electrodes 85$c$ function, individually or in combination, as a first plate of an air-gap capacitor.

Identifying device 38 generates E-field2 36 by applying transmit data to electrode 85. In this example, electrode 85 functions as the opposite plate of the air-gap capacitor. When E-field2 36 is generated by transmit data, it is referred to herein as an information signal. The information signal (E-Field 2 36) causes changes in the sense electric field (E-Field1 34). These changes produce variations in self-capacitances associated with row electrodes 85$r$ and/or column electrodes 85$c$. Variations in the self-capacitances of a particular row or column electrodes can be detected as changes in impedance measured by a drive sense circuit coupled to that particular row or column electrode.

A drive-sense circuit 28 includes an op-amp 33 coupled to receive a reference signal at its inverting input, a dependent current source 39 having an output coupled to the non-inverting input of op-amp 33, a feedback circuit 37 coupling the output of op-amp 33 to an input of the dependent current source 39, and an analog-to-digital converter (ADC) 35 coupled to the output of op-amp 33. Note that although a non-inverting embodiment is illustrated, inverting embodiments can also be used.

Because the voltages at the inverting and non-inverting inputs to the op-amp are equal, the reference signal will be placed on the row or column electrode coupled to the non-inverting input of the op-amp. The electrode will have a capacitance, and present a load that draws a given amount of current, which is supplied by the dependent current source 39. Any changes to the self-capacitance of the electrode coupled to the op-amp will cause a change in the amount of current provided to the electrode by dependent current source 39. Changes in the current provided by dependent current source 39 will cause corresponding changes in the outputs of the op-amp. Changes in the output of the op-amp are converted to sensed values 31 by the analog to digital converter 35.

Figure 4:
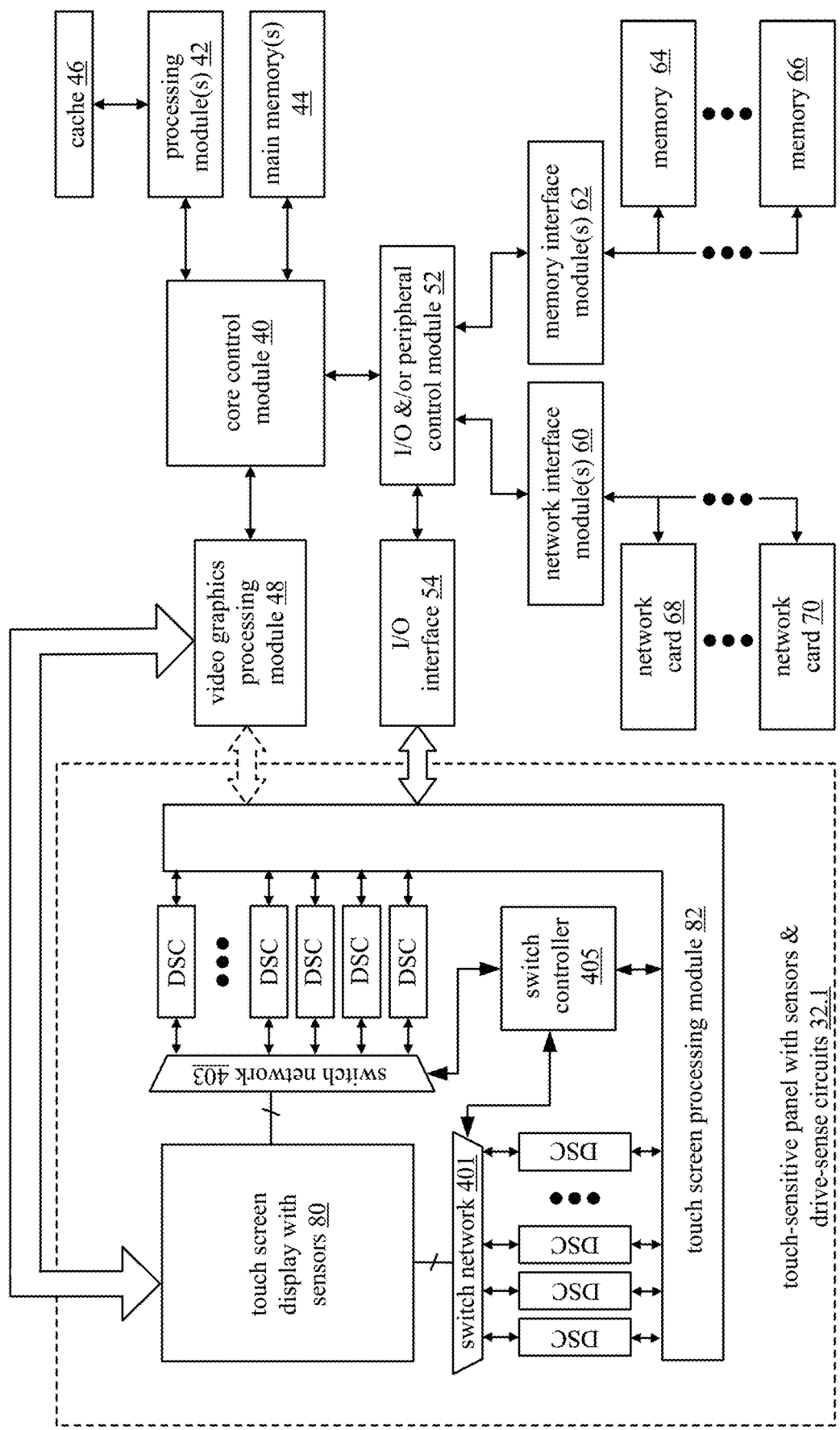
FIG. 4 is a schematic block diagram of an embodiment of a computing device in accordance with embodiments of the present disclosure.

FIG. 4 is a schematic block diagram of an embodiment of a computing device 14. The computing device 14 includes a touch-sensitive panel 32-1, a core control module 40, one or more processing modules 42, one or more main memories 44, cache memory 46, a video graphics processing module 48, a display 50, an Input-Output (I/O) peripheral control module 52, one or more input interface modules 56, one or more output interface modules 58, one or more network interface modules 60, and one or more memory interface modules 62. A processing module 42 is described in greater detail at the end of the detailed description section and, in an alternative embodiment, has a direct connection to the main memory 44. In an alternate embodiment, the core control module 40 and the I/O and/or peripheral control module 52 are one module, such as a chipset, a quick path interconnect (QPI), and/or an ultra-path interconnect (UPI).

The touch-sensitive panel 32-1 includes a touch screen display 80, a plurality of sensors 30, a plurality of drive-sense circuits (DSC), one or more switch networks 401 and 403, a switch controller 405, and a touch screen processing module 82. In general, the sensors (e.g., electrodes, capacitor sensing cells, capacitor sensors, etc.) detect a proximal touch of the screen, sense a capacitively-coupled information signal, or some combination of the two. Switch controller 405 selects particular sensors (row and column electrodes) to be coupled to particular drive-sense circuits (DSCs) to adjust a touch resolution and/or a sense resolution of all or part of the touch screen display 80. Switch controller 405 can receive information from any or all of the processing modules, and use that information as a basis for selecting sensors/DSC coupling arrangements. Switch controller 405 then transmits control signals to the switch network(s) 401 and 403 causing the switch networks to selectively couple the selected sensors to the selected drive sense circuits. For example, when one or more fingers touches the screen, or when an information signal is received, capacitances of sensors proximal to the touch(es) are affected (e.g., impedance changes). The drive-sense circuits (DSC) coupled to the affected sensors detect the change and provide a representation of the change to the touch screen processing module 82, which may be a separate processing module or integrated into the processing module 42. By changing the coupling of sensors to DSCs, a touch resolution or sensing resolution of the touch screen display can be changed. By using different coupling arrangements in different areas of the touch screen display, multiple different resolutions can be realized concurrently in those different areas.

The touch screen processing module 82 processes the representative signals from the drive-sense circuits (DSC) to determine the location of the touch(es). This information is inputted to the processing module 42 for processing as an input. For example, a touch represents a selection of a button on screen, a scroll function, a zoom in-out function, etc. The touch screen processing module 82 also operates to at least partially process information signals capacitively coupled to the touch screen display with sensors 80 from a remote device, e.g., identifying device. Further processing of the information signal may be performed by the I/O interface 54 or other components of the computing device 14.

Each of the main memories 44 includes one or more Random Access Memory (RAM) integrated circuits, or chips. For example, a main memory 44 includes four DDR4 (4$^{th}$ generation of double data rate) RAM chips, each running at a rate of 2,400 MHz. In general, the main memory 44 stores data and operational instructions most relevant for the processing module 42. For example, the core control module 40 coordinates the transfer of data and/or operational instructions from the main memory 44 and the memory 64-66. The data and/or operational instructions retrieved from memory 64-66 are the data and/or operational instructions requested by the processing module or will the instructions most likely be needed by the processing module. When the processing module is done with the data and/or operational instructions in main memory, the core control module 40 coordinates sending updated data to the memory 64-66 for storage.

The memory 64-66 includes one or more hard drives, one or more solid state memory chips, and/or one or more other large capacity storage devices that, in comparison to cache memory and main memory devices, is/are relatively inexpensive with respect to cost per amount of data stored. The memory 64-66 is coupled to the core control module 40 via the I/O and/or peripheral control module 52 and via one or more memory interface modules 62. In an embodiment, the I/O and/or peripheral control module 52 includes one or more Peripheral Component Interface (PCI) buses to which peripheral components connect to the core control module 40. A memory interface module 62 includes a software driver and a hardware connector for coupling a memory device to the I/O and/or peripheral control module 52. For example, a memory interface 62 is in accordance with a Serial Advanced Technology Attachment (SATA) port.

The core control module 40 coordinates data communications between the processing module(s) 42 and the network(s) 26 via the I/O and/or peripheral control module 52, the network interface module(s) 60, and a network card 68 or 70. A network card 68 or 70 includes a wireless communication unit or a wired communication unit. A wireless communication unit includes a wireless local area network (WLAN) communication device, a cellular communication device, a Bluetooth device, and/or a ZigBee communication device. A wired communication unit includes a Gigabit LAN connection, a Firewire connection, and/or a proprietary computer wired connection. A network interface module 60 includes a software driver and a hardware connector for coupling the network card to the I/O and/or peripheral control module 52. For example, the network interface module 60 is in accordance with one or more versions of IEEE 802.11, cellular telephone protocols, 10/100/1000 Gigabit LAN protocols, etc.

The core control module 40 coordinates data communications between the processing module(s) 42 and input device(s) 72 via the input interface module(s) 56 and the I/O and/or peripheral control module 52. An input device 72 includes a keypad, a keyboard, control switches, a touchpad, a microphone, a camera, etc. An input interface module 56 includes a software driver and a hardware connector for coupling an input device to the I/O and/or peripheral control module 52. In an embodiment, an input interface module 56 is in accordance with one or more Universal Serial Bus (USB) protocols.

The core control module 40 coordinates data communications between the processing module(s) 42 and output device(s) 74 via the output interface module(s) 58 and the I/O and/or peripheral control module 52. An output device 74 includes a speaker, etc. An output interface module 58 includes a software driver and a hardware connector for coupling an output device to the I/O and/or peripheral control module 52. In an embodiment, an output interface module 56 is in accordance with one or more audio codec protocols.

The processing module 42 communicates directly with a video graphics processing module 48 to display data on the display 50. The display 50 includes an LED (light emitting diode) display, an LCD (liquid crystal display), and/or other type of display technology. The display has a resolution, an aspect ratio, and other features that affect the quality of the display. The video graphics processing module 48 receives data from the processing module 42, processes the data to produce rendered data in accordance with the characteristics of the display, and provides the rendered data to the display 50.

In various embodiments, touch screen processing module 82 can receive touch-related image information, rate of motion information, content meta-data and/or other video content-related information from the video graphics processing module 48.

Figure 5:
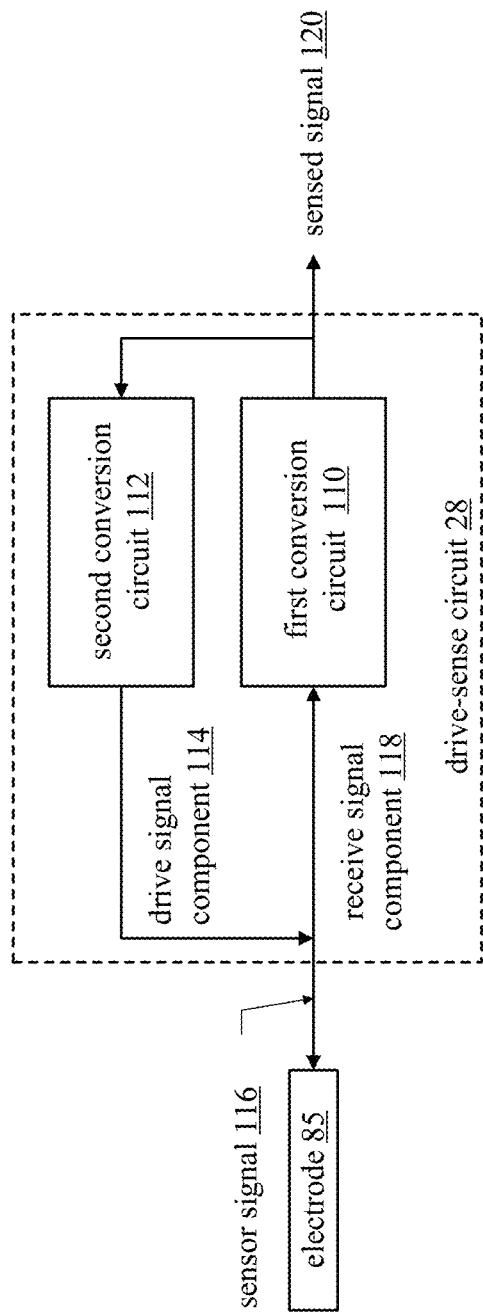
FIG. 5 is a schematic block diagram of an embodiment of a drive sense circuit in accordance with embodiments of the present disclosure.

FIG. 5 is a schematic block diagram of an embodiment of a drive sense circuit 28 that includes a first conversion circuit 110 and a second conversion circuit 112. The first conversion circuit 110 converts a sensor signal 116 into a sensed signal 120. The second conversion circuit 112 generates the drive signal component 114 from the sensed signal 112. As an example, the first conversion circuit 110 functions to keep the sensor signal 116 substantially constant (e.g., substantially matching a reference signal) by creating the sensed signal 120 to correspond to changes in a receive signal component 118 of the sensor signal. The second conversion circuit 112 functions to generate a drive signal component 114 of the sensor signal based on the sensed signal 120 to substantially compensate for changes in the receive signal component 118 such that the sensor signal 116 remains substantially constant.

In an example, the drive signal 116 is provided to the electrode 85 as a regulated current signal. The regulated current (I) signal in combination with the impedance (Z) of the electrode creates an electrode voltage (V), where V=I*Z. As the impedance (Z) of electrode changes, the regulated current (I) signal is adjusted to keep the electrode voltage (V) substantially unchanged. To regulate the current signal, the first conversion circuit 110 adjusts the sensed signal 120 based on the receive signal component 118, which is indicative of the impedance of the electrode and change thereof. The second conversion circuit 112 adjusts the regulated current based on the changes to the sensed signal 120.

As another example, the drive signal 116 is provided to the electrode 85 as a regulated voltage signal. The regulated voltage (V) signal in combination with the impedance (Z) of the electrode creates an electrode current (I), where I=V/Z. As the impedance (Z) of electrode changes, the regulated voltage (V) signal is adjusted to keep the electrode current (I) substantially unchanged. To regulate the voltage signal, the first conversion circuit 110 adjusts the sensed signal 120 based on the receive signal component 118, which is indicative of the impedance of the electrode and change thereof. The second conversion circuit 112 adjusts the regulated voltage based on the changes to the sensed signal 120.

Figure 6:
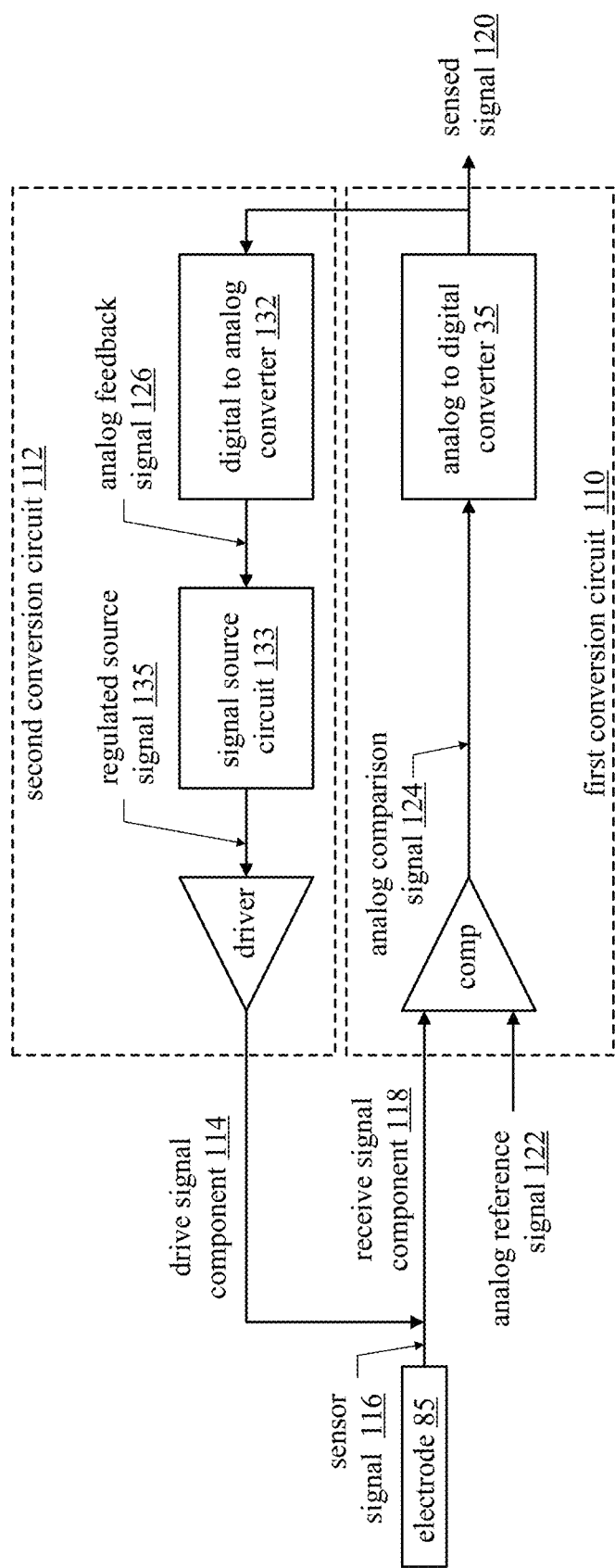
FIG. 6 is a schematic block diagram of another embodiment of a drive sense circuit in accordance with embodiments of the present disclosure.

FIG. 6 is a schematic block diagram of another embodiment of a drive sense circuit 28 that includes a first conversion circuit 110 and a second conversion circuit 112. The first conversion circuit 110 includes a comparator (comp) and an analog to digital converter 35. The second conversion circuit 112 includes a digital to analog converter 132, a signal source circuit 133, and a driver.

In an example of operation, the comparator compares the sensor signal 116 to an analog reference signal 122 to produce an analog comparison signal 124. The analog reference signal 122 includes a DC component and an oscillating component. As such, the sensor signal 116 will have a substantially matching DC component and oscillating component. An example of an analog reference signal 122 will be described in greater detail with reference to FIG. 15.

The analog to digital converter 35 converts the analog comparison signal 124 into the sensed signal 120. The analog to digital converter (ADC) 35 may be implemented in a variety of ways. For example, the (ADC) 35 is one of: a flash ADC, a successive approximation ADC, a ramp-compare ADC, a Wilkinson ADC, an integrating ADC, a delta encoded ADC, and/or a sigma-delta ADC. The digital to analog converter (DAC) 214 may be a sigma-delta DAC, a pulse width modulator DAC, a binary weighted DAC, a successive approximation DAC, and/or a thermometer-coded DAC.

The digital to analog converter (DAC) 132 converts the sensed signal 120 into an analog feedback signal 126. The signal source circuit 133 (e.g., a dependent current source, a linear regulator, a DC-DC power supply, etc.) generates a regulated source signal 135 (e.g., a regulated current signal or a regulated voltage signal) based on the analog feedback signal 126. The driver increases power of the regulated source signal 135 to produce the drive signal component 114.

Figure 7:
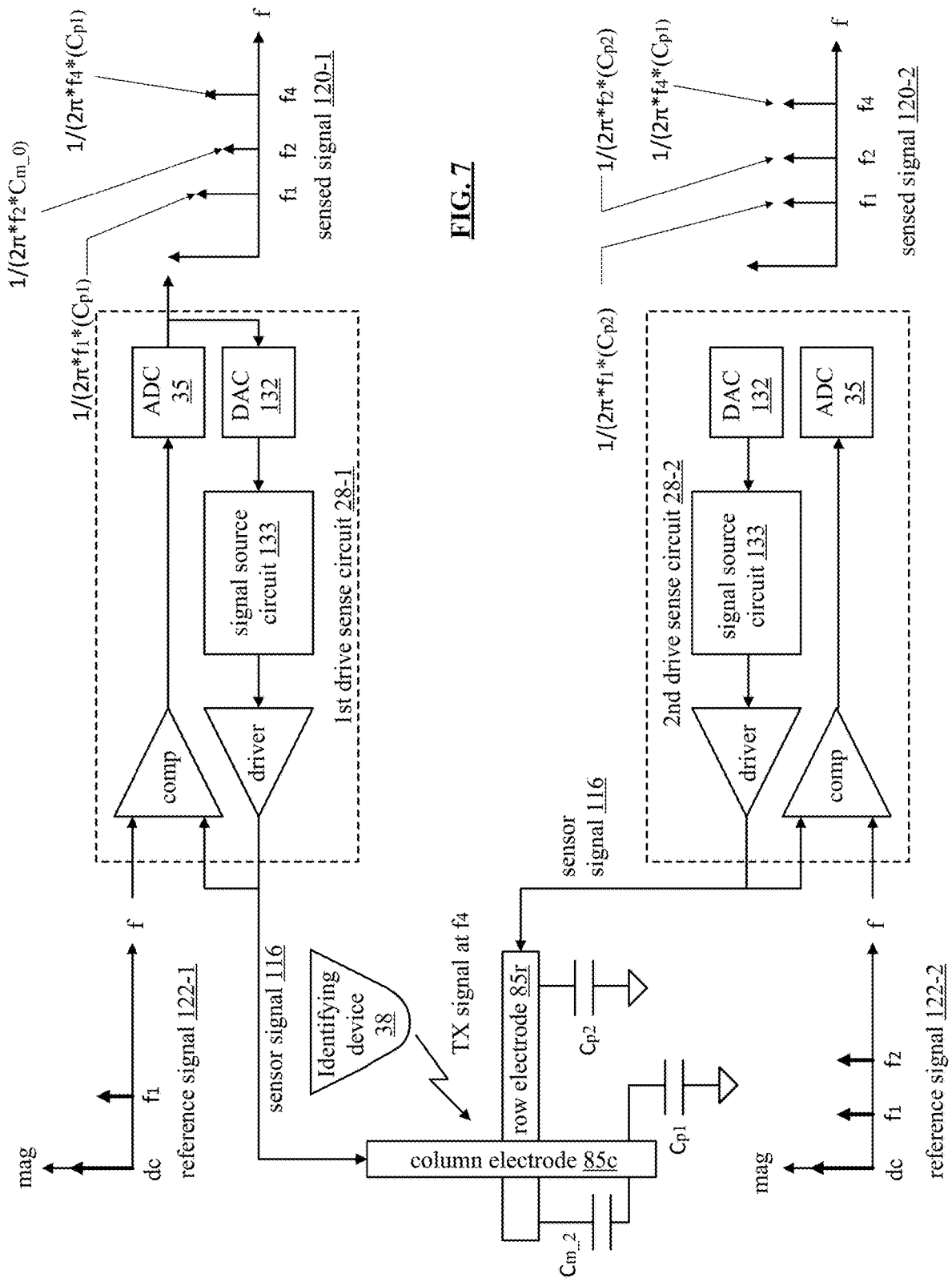
FIG. 7 is a schematic block diagram of another example of a first drive sense circuit coupled to a first electrode and a second drive sense circuit coupled to a second electrode with an identifying device proximal to the electrodes in accordance with embodiments of the present disclosure.

FIG. 7 is a schematic block diagram of an example of a first drive sense circuit 28-1 coupled to a column electrode 85-$c$ and a second drive sense circuit 28-2 coupled to a row electrode 85-$r$ with an identifying device 38 proximal to the electrodes. In this example, when it is said that the identifying device is "proximal" to the electrodes, the identifying device 38 is close enough to capacitively couple an information signal from the identifying device 38 to the electrodes. In the illustrated example, the identifying device can be, for example, a pen. Each of the drive sense circuits include a comparator, an analog to digital converter (ADC) 35, a digital to analog converter (DAC) 132, a signal source circuit 133, and a driver. The functionality of this embodiment of a drive sense circuit was described with reference to FIG. 6. The identifying device is operable to transmit a signal at one or more frequencies. In the illustrated embodiment, the identifying device is a pen transmitting an information signal at a frequency of f4, which affects the self and mutual capacitances of the electrodes 85. The identifying device is not limited to transmitting the information signal at a single frequency, and can instead encode an identifier using multiple frequencies, patterns of frequencies, amplitudes, timing, or some combination thereof.

In this example, a first reference signal 122-1 is provided to the first drive sense circuit 28-1. The first reference signal includes a DC component and/or an oscillating component at frequency $f_1$. The first oscillating component at $f_1$ is used to sense impedance of the self-capacitance of the column electrode 85$c$. The first drive sense circuit 28-1 generates a first sensed signal 120-1 that includes three frequency dependent components. The first frequency component at $f_1$ corresponds to the impedance of the self-capacitance at $f_1$, which equals $1/(2\pi f_1 C_{p1})$. The second frequency component at $f_2$ corresponds to the impedance of the mutual-capacitance at $f_2$, which equals $1/(2\pi f_2 C_{m\_0})$. The third frequency component at f4 corresponds to the signal transmitted by the identifying device.

Continuing with this example, a second reference signal 122-2 is provided to the second drive sense circuit 28-2. The second analog reference signal includes a DC component and/or two oscillating components: the first at frequency $f_1$ and the second at frequency $f_2$. The first oscillating component at $f_1$ is used to sense impedance of the shielded self-capacitance of the row electrode 85-$r$ and the second oscillating component at $f_2$ is used to sense the unshielded self-capacitance of the row electrode 85-$r$. The second drive sense circuit 28-2 generates a second sensed signal 120-2 that includes three frequency dependent components. The first frequency component at $f_1$ corresponds to the impedance of the shielded self-capacitance at $f_3$, which equals $1/(2\pi f_1 C_{p2})$. The second frequency component at $f_2$ corresponds to the impedance of the unshielded self-capacitance at $f_2$, which equals $1/(2\pi f_2 C_{p2})$. The third frequency component at f4 corresponds to an information signal transmitted by the identifying device.

As a further example, the identifying device transmits a sinusoidal signal having a frequency of $f_4$. When the identifying device is near the surface of the touch screen, electromagnetic properties of the signal increase the voltage on (or current in) the electrodes proximal to the touch of the identifying device, or a person in contact with the identifying device. Since impedance is equal to voltage/current and as a specific example, when the voltage increases for a constant current, the impedance increases. As another specific example, when the current increases for a constant voltage, the impedance increases. The increase in impedance is detectable and is used as an indication of a touch.

Figure 8:
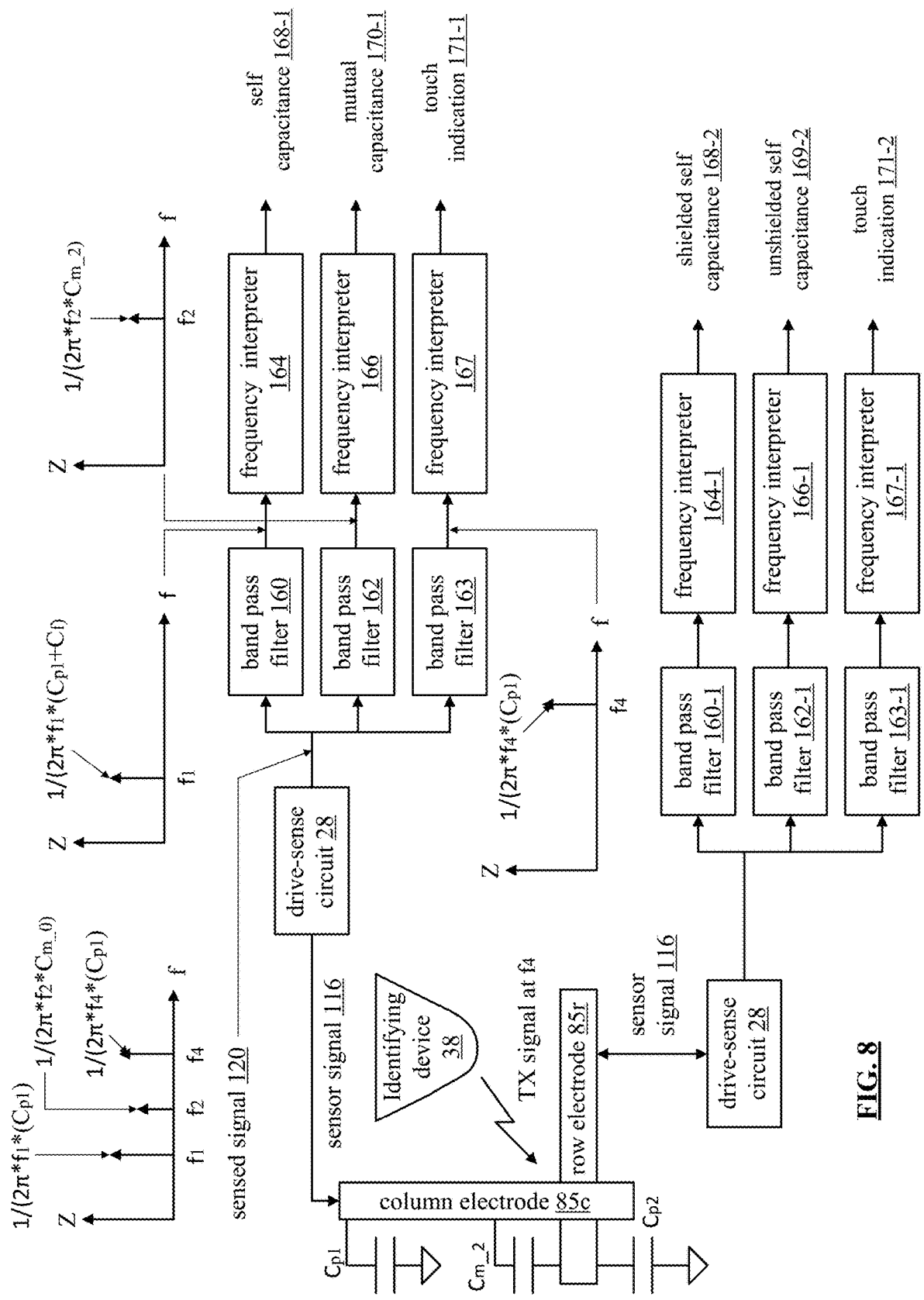
FIG. 8 is a schematic block diagram of an example of information signal generated by an identifying device being sensed by a few drive sense circuits and a portion of the touch screen processing module of a touch screen display in accordance with embodiments of the present disclosure.

FIG. 8 is a schematic block diagram illustrating an example of an information signal, which is generated by an identifying device, being sensed by a few drive sense circuits and being processed by a portion of the touch screen processing module of a touch screen display that is similar to FIG. 7, with the difference being a touch of either the identifying device, or the touch of a person in contact with the identifying device. In this example, the self-capacitance and/or mutual capacitance of the electrodes is affected by the information signal transmitted by the identifying device 38, as well as by a touch.

The effected self-capacitance of the column electrode 85c is processed by the first bandpass filter 160 and the frequency interpreter 164 to produce a self-capacitance value 168-1a. The effected mutual capacitance of the column electrode 85c and row electrode 85r is processed by the second bandpass filter 162 and the frequency interpreter 166 to produce a mutual-capacitance value 170-1a.

The effected shielded self-capacitance of the row electrode 85r is processed by the third bandpass filter 160-1 and the frequency interpreter 164-1 to produce a shielded self-capacitance value 168-2a. The effected unshielded self-capacitance of the row electrode 85r is processed by the fourth bandpass filter 162-1 and the frequency interpreter 166-1 to produce an unshielded self-capacitance value 170-2a. As illustrated by FIGS. 7 and 8, a touch screen, or other touch-sensitive panel, can be used to perform its normal touch-sensing function, while concurrently sensing a capacitively coupled information signal.

Figure 9:
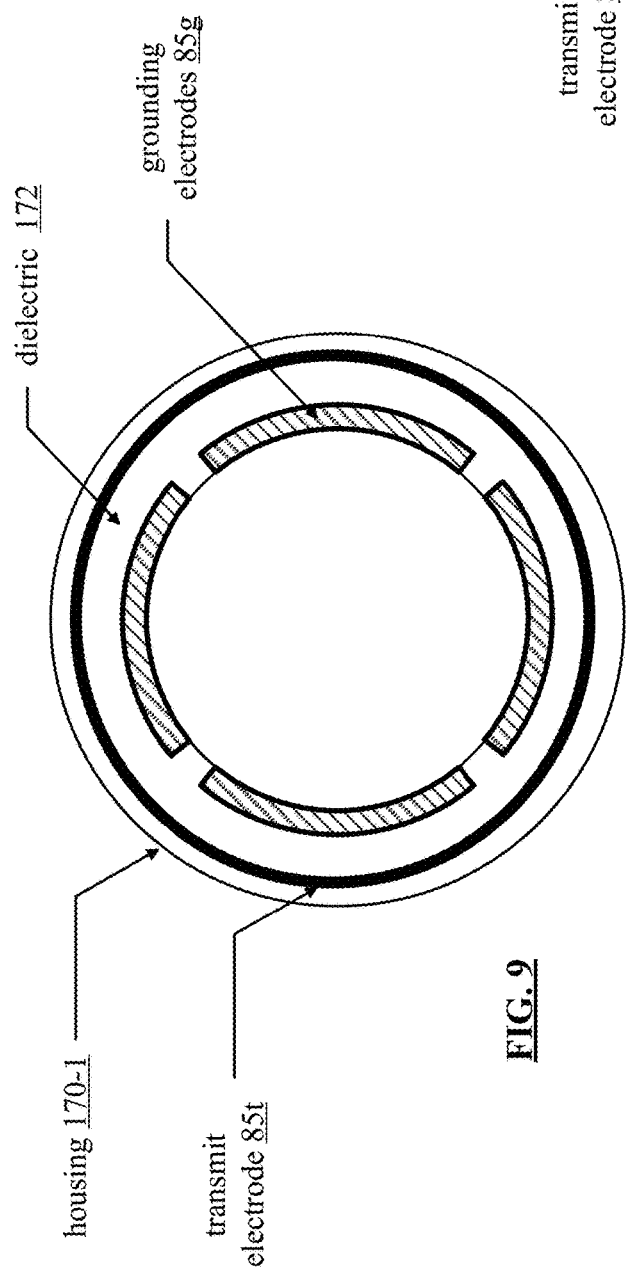
FIG. 9 is a diagram illustrating an identifying device implemented as a wearable ring in accordance with embodiments of the present disclosure.
Figure 12:
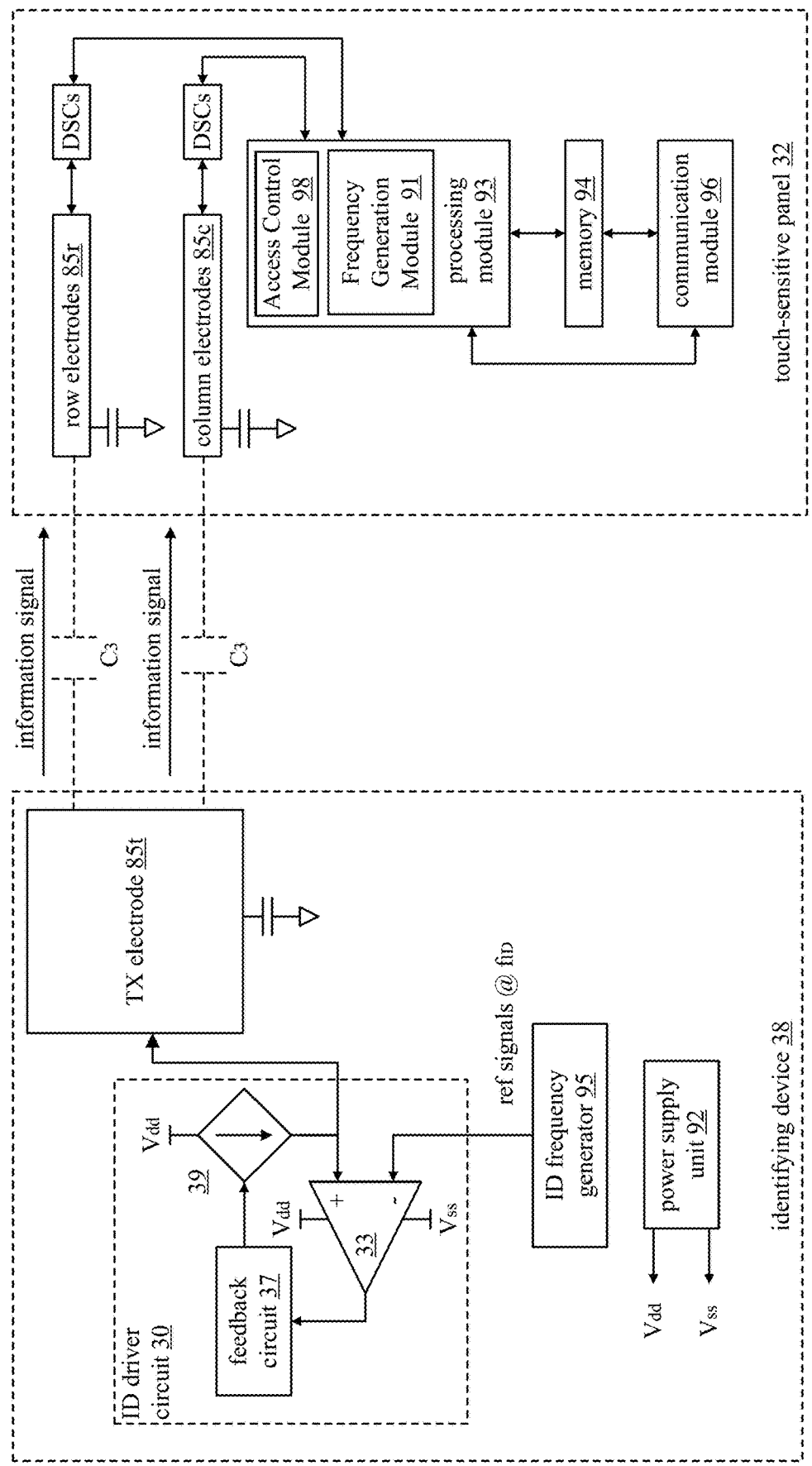
FIG. 12 is a schematic block diagram illustrating a communication system including an identifying device capacitively coupled to a touch-sensitive panel, in accordance with embodiments of the present disclosure.

FIG. 9 is a diagram illustrating an identifying device implemented as a wearable ring. The wearable ring includes a housing 170-1 in the shape of ring, transmit electrode 85t, and grounding electrodes 85g separated from the transmit electrode 85t by dielectric 172. The circuitry illustrated and discussed with reference to FIG. 12 is also included within the housing. The circuitry can be embedded in the dielectric 172, with appropriate connections to grounding and transmit electrodes.

In an example of operation, the ring is worn on a user's finger, so that the grounding electrodes 85g contact the user's body. Signals having one or more frequencies are applied to the transmit electrode to generate an information signal. The electric field will vary in accordance with the signals applied to the transmit electrode The grounding electrodes provide a capacitive grounding path for the signals. The signals cause the transmit electrode to generate an electric field encoding an information signal, which can be sensed by a touch-sensitive panel in proximity to the user. The exact distances required for capacitively coupling the information signal to a touch-sensitive panel can vary based on the strength of the electric field generated by the transmit electrode, a number and size of row and column electrodes employed by the touch-sensitive panel being used to sense the information signal, a manner in which the row and column electrodes of the touch-sensitive device are coupled to drive sense circuits, a strength and frequency of reference signals used by the touch-sensitive device, environmental conditions such as humidity, and the like. Note that because the user forms part of the capacitive signal path, the user's touch can, in some embodiments, be used as the means for capacitively coupling the information signal to a touch-sensitive panel.

In some embodiments, a battery can be included in the housing, and used to supply the identifying device with power. In other embodiments the identifying device includes circuitry capable of harvesting harvest power from electrical fields generated by a proximate touch-sensitive panel by using the transmit electrode to receive a power signal from the touch-sensitive panel. Power harvesting is discussed further with respect to FIG. 17.

Figure 10:
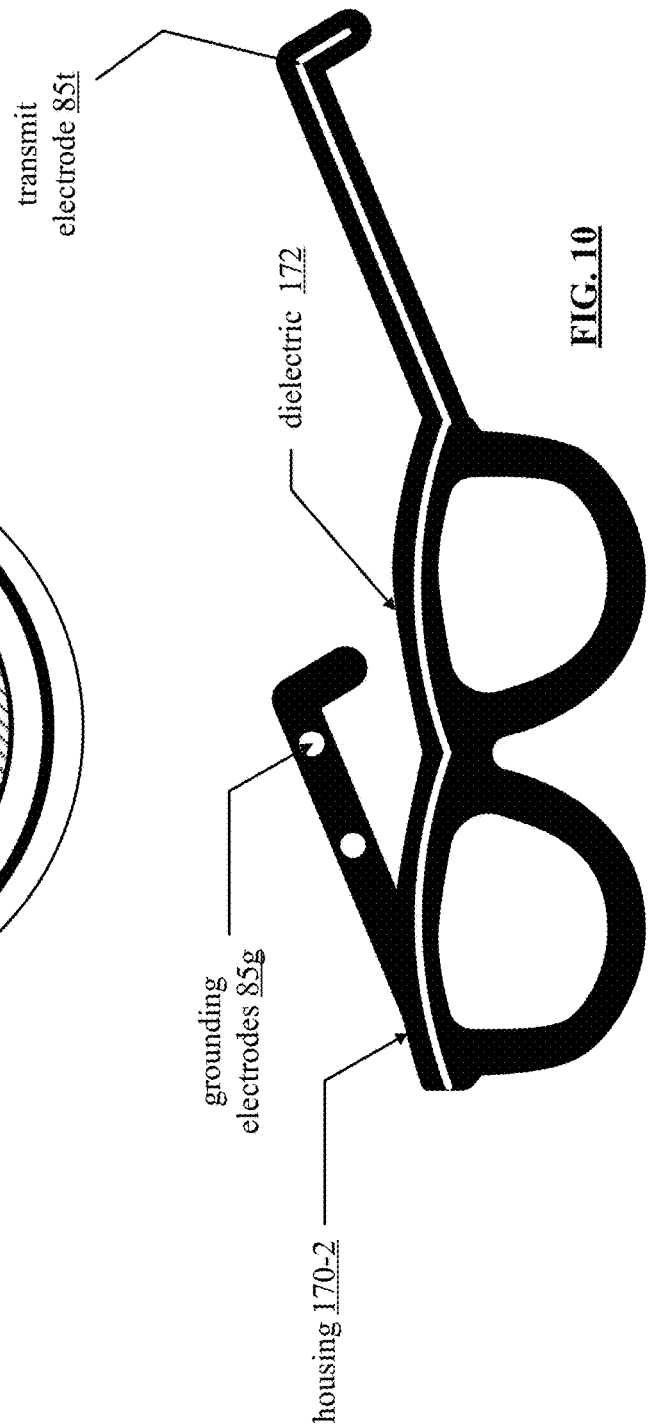
FIG. 10 is a diagram illustrating an identifying device implemented as a pair of glasses in accordance with embodiments of the present disclosure.

FIG. 10 is a diagram illustrating an identifying device implemented as a pair of glasses. The illustrated identifying device includes a housing 170-2 in the shape of a pair of glasses, transmit electrode 85t, and grounding electrodes 85g separated from the transmit electrodes 85t by dielectric 172. The glasses-shaped identifying device functions in a manner similar to the ring-shaped identifying device.

Figure 11:
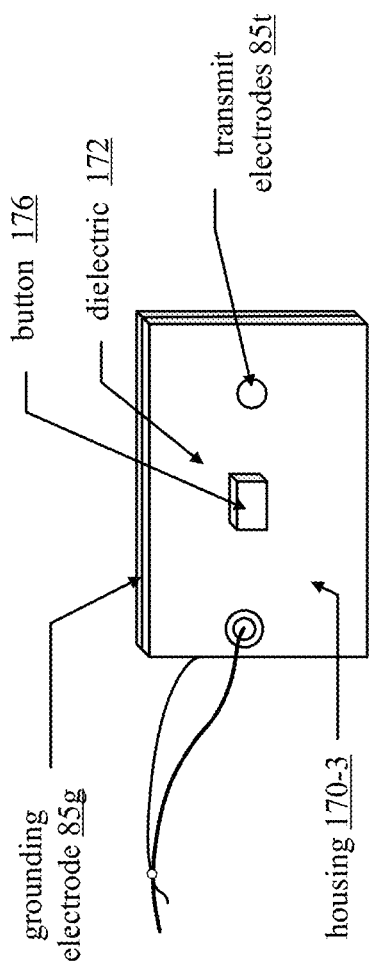
FIG. 11 is a diagram illustrating an identifying device implemented as a carriable/wearable device in accordance with embodiments of the present disclosure in accordance with embodiments of the present disclosure.

FIG. 11 is a diagram illustrating an identifying device implemented as a carriable/wearable device. The illustrated identifying device includes a housing 170-3 in the shape of a FOB, tag, or small keycard attachable to a keychain, necklace, bracelet or the like. The FOB-shaped identifying device functions similarly to the other identifying devices discussed in FIGS. 9 and 10, with the exception of an optional actuating button 176.

In some embodiments, the housing of the FOB-shaped identifying device can include an adhesive strip, snap, hook and loop fastener, or the like that permits mounting the identifying device on a package, clothing, or other object. The identifying device also includes transmit electrode 85t, and a grounding electrode 85g separated from the transmit electrodes 85t by dielectric 172. The grounding electrode 85g can be implemented as a conductive material forming a portion of the housing. When the conductive portion of the housing contacts a user's body, the grounding electrode 85g completes the capacitive ground path.

In at least one embodiment, the actuating button 176 can be used to apply or remove power from circuitry included in the identifying device. In other embodiments, the grounding electrode 85g can be formed as a planar sheet or pad of conductive material, positioned within the housing; pressing the actuating button 176 couples the user to the grounding electrode.

FIG. 12 is a schematic block diagram illustrating a communication system including an identifying device 38 capacitively coupled to a touch-sensitive panel 32. Identifying device 38 includes a power supply unit 92, an ID frequency generator 95, a driver 30, and a transmit electrode 85t. Touch sensitive panel 32 includes row electrodes 85r, column electrodes 85c, drive sense circuits 28, a processing module 93 that further includes an access control module 98 and a frequency generation module 91, memory 94, and a communications module 96 configured to communicate to a communications network via a wired connection, via a radio-frequency wireless connection, or the like.

In an example of operation, identifying device 38 uses the ID frequency generator 95 to generate a modulated signal having one or more selected carrier frequencies, which are modulated to carry the identifier. Examples of operations, modulation types, and carrier frequencies that are used to produce the information signal are discussed further with refence to FIGS. 15, 16A, 16B, 18 and 19. The information signal carrying the identifier are supplied to the ID driver circuit 30, which increases the power of those signals, and then applies the information signal to the transmit electrode 85t, which is transmitted by creating an electric field corresponding to the signals making up the identifier. The frequency band of the information signal is in a frequency band that will be efficiently capacitively coupled from the identifying device 38 to the touch-sensitive panel 32. The frequency band used has to be high enough to be efficiently transmitted via capacitively coupling and low enough not to be in an RF band.

The touch-sensitive panel 32 receives the information signal via capacitive coupling between the transmit electrode 85t and the row and column electrodes, via a path including C3. The capacitive coupling path that includes C3 is formed when the identifying device, or a human in contact with the identifying device is physically proximate to the touch sensitive panel 32. The drive sense circuits 28 sense changes in impedance cause by changes in the self-capacitance of the row and/or column electrodes caused by presence of the information signal. The drive sense circuits output sensed signals, which include the information signal, to processing module 93. Processing module 93 uses the access control module 98 to combine the sensed signals and recognize, recover, recreate, or otherwise extract the identifier included in the information signal transmitted by the identifying device 38. Processing module 93 can store the identifier in memory 94, communicate the identifier to an external device via communications module 96, or use the identifier in conjunction with local processing functions.

The frequency generation module 91 determines and controls generation of frequencies to be used by the drive sense circuits for: sensing reference signals, providing power signals to be used by the identifying device 38 for power harvesting, and transmitting capacitively coupled data back to the identifying device 38. For example, the identifying device can include a second touch-sensitive panel similar to touch-sensitive panel 32, that supports two-way capacitive communications. Further, the processing module 93 functions to detect touches on the touch-sensitive panel 32. Thus, as will be further described with reference to FIGS. 29-31, a touch of the touch-sensitive panel 32 may convey information based upon one or more touch locations while the identifier is communicated from the identifying device 38 to the touch-sensitive panel 32. This combination of information or conveyance of the identifier alone may be very useful for various applications, including package delivery, the identification of a user to unlock operation of a device serviced by the touch-sensitive panel 32, e.g., cell phone, tablet computer, or other computing device, to identify a user for access to secure equipment or a secure location, e.g., in an industrial location, office location, home, etc.

Figure 13:
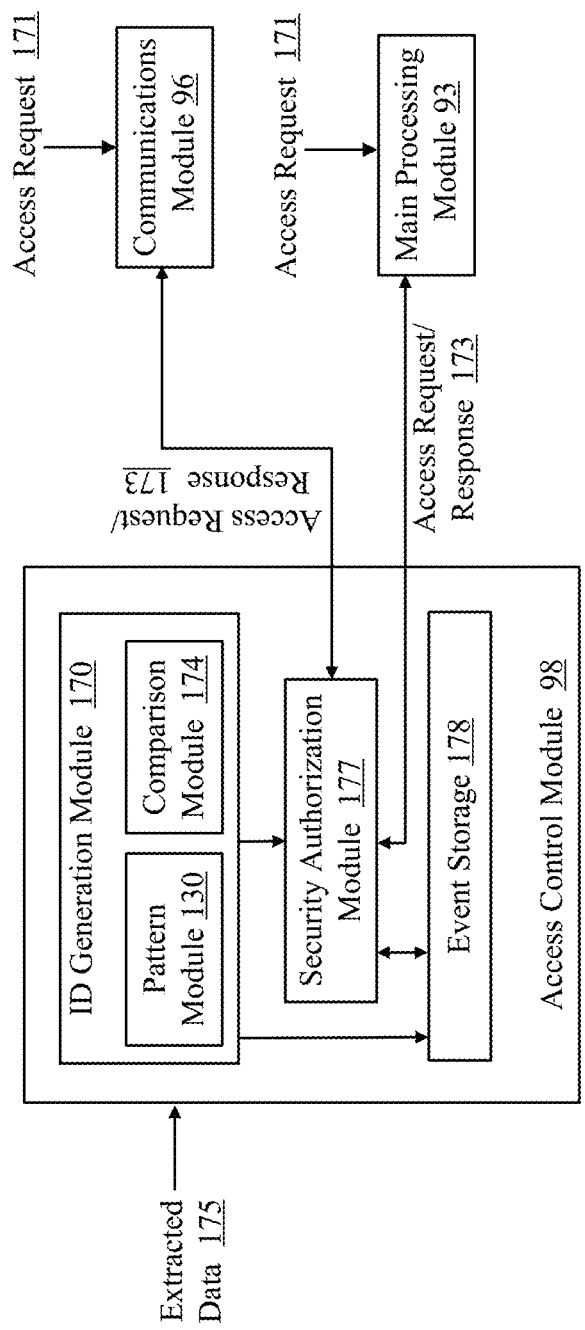
FIG. 13 is a block diagram of an access control module included in a touch-sensitive panel in accordance with embodiments of the present disclosure.

FIG. 13 is a block diagram of an access control module 98 included in a touch-sensitive panel. Access control module 98 includes an ID generation module 170 for recognizing an identifier carried by the information signal transmitted by the identifying device, a security authorization module 177 for using an identifier recognized by ID generation module 170 to control access to various functions, and an event storage module 178 for storing information related to extraction and recognition of identifiers, and security access authorizations or denials associated with the extracted identifiers.

The ID generation module 170 includes a pattern module 130 and a comparison module 174. The extracted data from one or more drive sense circuits is used by pattern module 130 and comparison module 174 to identify patterns representing identifiers.

An identifier can be represented by one or more frequencies or patterns of frequencies included in the information signal transmitted by the identifying device. The identifier can also be represented by one or more amplitudes or patterns of amplitudes of the one or more frequencies. In further embodiments, the identifier can also be represented by a timing or spatial pattern of those one or more frequencies. Any combination of frequency, frequency order, amplitude, amplitude order, spatial arrangements, or the like can be used consistent with the teachings set forth herein.

In a specific example, an identifier may be defined as a pattern of four frequencies, with the first and third frequencies having an amplitude representing logic 1's and the second and fourth frequencies having amplitudes representing logic 0's during a first period of time, followed immediately in time by those same four frequencies, but with the second and fourth frequencies having amplitudes representing logic 1's and the first and third frequencies having amplitudes representing logic 0's.

As another example, an identifier can be defined as a specific sequence of 8 frequency groups G1-G8 made up of 4 different frequencies, f1-f4; G1 includes f1 and f2, the G2 includes f2 and f3; G3 includes f3 and f4, G4 includes f1 and f3, G5 includes another instance of f1 and f2, G6 includes f3 and f4, G7 includes f2 and f4, while G8 includes a third instance of f1 and f2.

Pattern module 130 receives extracted data from one or more row and column electrodes, and attempts to reconstruct and identify a pattern of the original information signal, so that the identifier can be recognized. The pattern module 130 operates to recognize the pattern by temporarily storing the extracted data in registers, or in a cache memory, in the order in which it is received. The comparison module 174 can be used to compare the temporarily stored data to data stored in lookup tables that correlate particular patterns to known identifiers. This comparison can be performed in near-real time, each time a piece of extracted data received, until a matching identifier is found in the lookup table. In other implementations, a "begin" tag and/or an "end" tag can be encoded in the information signal, and the pattern module stores and tests extracted data received between the begin and end tags. In some implementations, different drive sense circuits respond to different frequency components of an information signal. In some such cases, the pattern module can receive multiple items of extracted data at once, and can determine which drive sense circuit transmitted the data based on the data line on which the extracted data is received. When extracted data is received by row or column electrodes in different portions of the touch-sensitive display, the spatial location of the electrodes can be taken into account when attempting to identify a spatial pattern that forms part of the identifier extracted from the information signal.

Security authorization module 177 validates/approves access requests 171 received from an external device via communications module 96, or provided internally to main processing module 93. The access requests can include requests for full or partial access to local functionality of a touch-sensitive panel in which access control module 98 is located, for example a request for access to communications module 96, access to a software application, access to locally stored files, or the like. In other embodiments, an access request can specify access to functionality associated with a different device, for which the touch-sensitive panel 32 provides primary or secondary authentication services.

For example, a security system may receive a request for authorization to enter a room in the form of an alphanumeric PIN entered into a keypad. Upon validation of the PIN, the keypad sends an access request to a mobile device carried by a user associated with the PIN. The mobile device associated with the user includes a touch screen configured in accordance with the teachings set forth herein. The user's mobile device prompts the user to place an identifying device proximate to the touch screen. In response to the prompt, the user places an identifying device, e.g. a FOB, in proximity to the touch screen. The FOB transmits an identifier included in a capacitively-coupled information signal, which is sensed by the touch screen of the user's device. The access module verifies the identifier, and responds to the security system that a valid identifier has been received. The security system can then act on that response to allow the user to enter the room.

Security authorization module 177 can determine whether a valid identifier has been received by querying event storage 178. In one example, ID generation module 170 stores an event record in event storage 178 in response to identifying a valid identifier. The event record can include a time, a pointer to the identifier, and other pertinent information. Similarly, ID generation module 170 stores an event record if pattern module 130 recognizes an identifier, but comparison module 174 or security authorization module 177 determines that the identifier is invalid because it is included in a revocation list.

Figure 14:
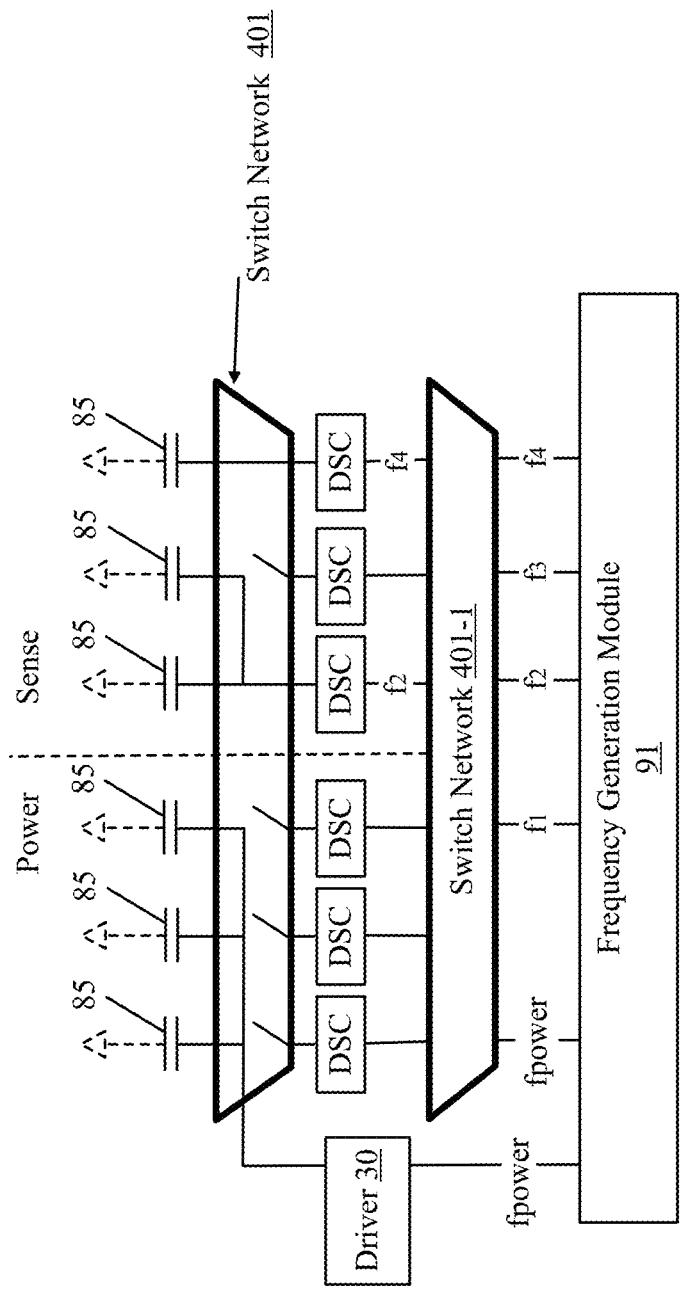
FIG. 14 is a schematic diagram of switch networks coupling signals having different frequencies to different electrodes for use in providing power and/or sensing capacitively-coupled information signals in accordance with embodiments of the present disclosure.

FIG. 14 is a schematic diagram of switch networks coupling signals having different frequencies to different electrodes for use in providing power and/or sensing capacitively-coupled information signals. In embodiments such as those discussed with reference to FIG. 4, a touch-sensitive device includes one or more switch networks for selectively coupling electrodes to drive sense circuits to adjust sensitivity, resolution, and the like. Selectively coupling drive-sense circuits to particular frequencies can be performed in conjunction with selectively coupling drive-sense circuits to particular electrodes, so that different sense or transmit frequencies can be distributed to different portions of a touch-sensitive display, or to different combinations of row and column electrodes.

Frequency generation module 91 generates signals having frequencies for use in power coupling, data transmission, and/or sensing. The signals are selectively coupled to particular drive-sense circuits using switch network 401-1. The drive-sense circuits are selectively coupled to particular electrodes 85 via switch network 401. In the illustrated embodiment, switch network 401 also selectively couples power signals generated by frequency generation module 91 to particular electrodes 85 via driver 30, effectively bypassing one or more drive sense circuits. Driver 30 can be used in some embodiments to increase the strength of power signals provided for power harvesting by identifying devices. The power harvesting signals may have the same frequency as one or more of the sensing or data signals generated by frequency generation module 91, but in at least one embodiment, the power signals have a different frequency than sensing or data signals. The frequency of the power harvesting signals, $f_{Power}$ can be selected to provide more transmitted power, to provide frequency separation between sense and power signals, or the like.

In the illustrated example, electrodes in a first physical area of a touch-sensitive panel are used to provide power that can be harvested by an identifying device, while other frequencies are used in another portion of the touch-sensitive panel is used to sense a capacitively-coupled information signal. In this example, three electrodes are coupled together, forming a relatively larger electrode pad in one portion of the touch-sensitive panel for use in power transmission. A first sensing/transmission signal having a frequency f2 is coupled through a single drive-sense circuit to two electrodes 85, forming an electrode sensing pad from electrodes in a portion of the touch-sensitive panel different from the portion used for power transmission. A second sensing/transmission signal having a frequency f4 is coupled through a drive-sense circuit to a single electrode in yet another portion of the touch-sensitive panel. By controlling how many electrodes are coupled to particular drive-sense circuits and to particular frequencies, various embodiments provide flexibility in establishing sensing sensitivity sensing, transmission power, and the like.

Figure 15:
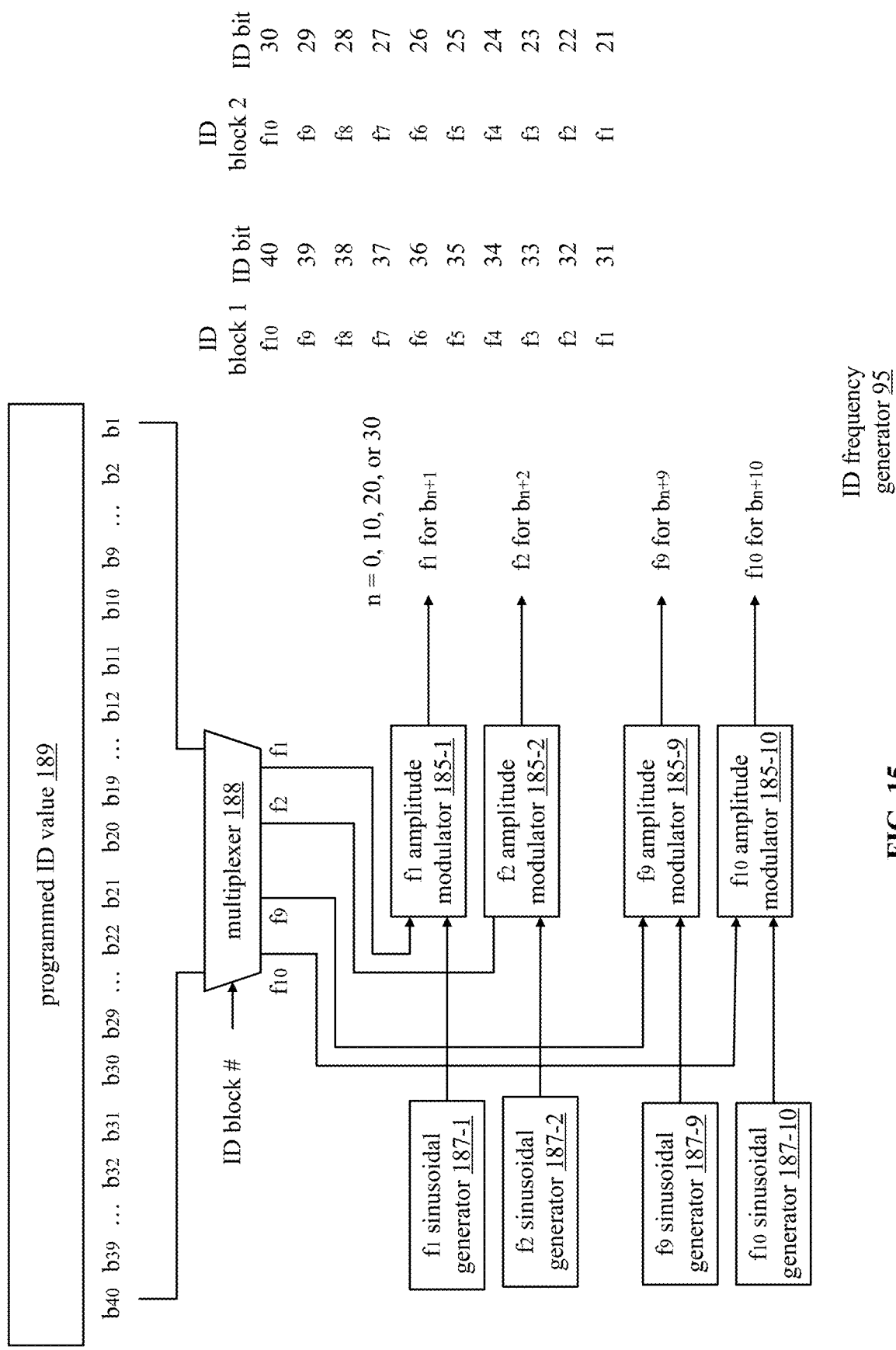
FIG. 15 is a schematic block diagram of an identification frequency generator included in an identifying device in accordance with embodiments of the present disclosure.

FIG. 15 is a schematic block diagram of an identification frequency generator 95 included in an identifying device. The identifier is represented at a programmed ID value 189 (identifier) and includes 40 bits, which supports $2^{10}$ unique identifiers. With the example of FIG. 15, four bits of the identifier 189 are carried by four carrier frequencies $f_1$, $f_2$, $f_9$ and $f_{10}$. Multiplexor 188 is controlled to select four bits of the identifier (programmed ID value 189) at a time to be modulated with corresponding carrier frequencies via amplitude modulators 185-1, 185-2, 185-3 and 185-4. Thus, to convey a 40 bit identifier, 10 unique time segments are required. Thus, the embodiment of FIG. 15 illustrates a combination of time-division and frequency-division multiplexing to convey the identifier from a first device to a second device.

Figure 16A:
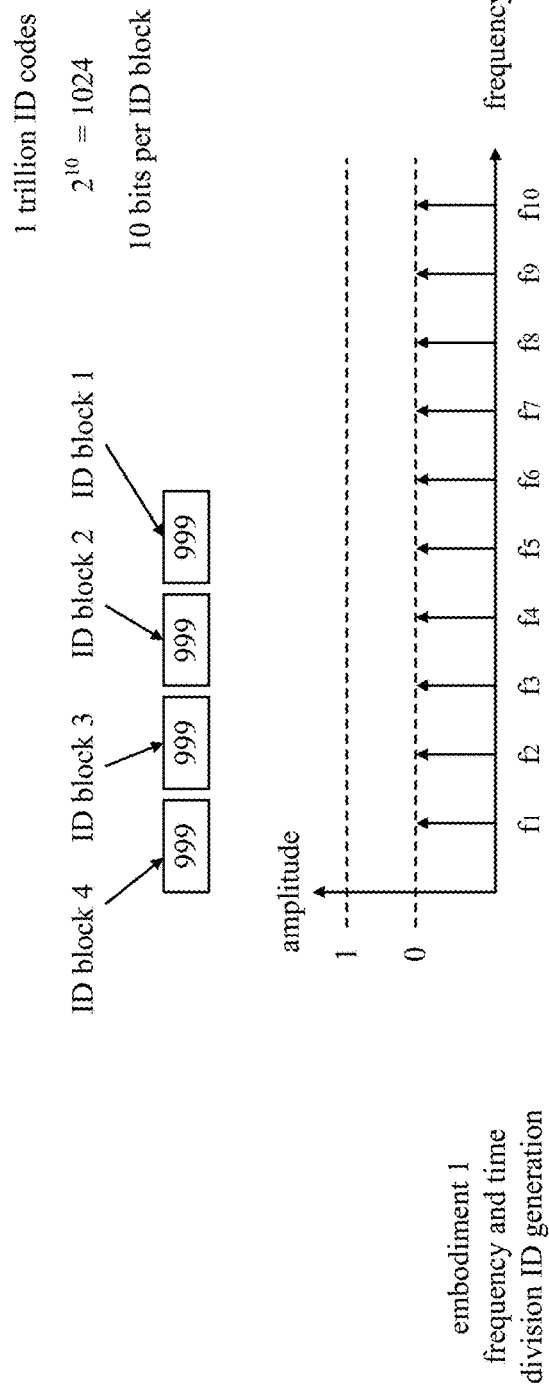
FIGS. 16A and 16B are diagrams illustrating the modulation of carrier signals to carry identification codes in accordance with embodiments of the present disclosure.
Figure 16B:
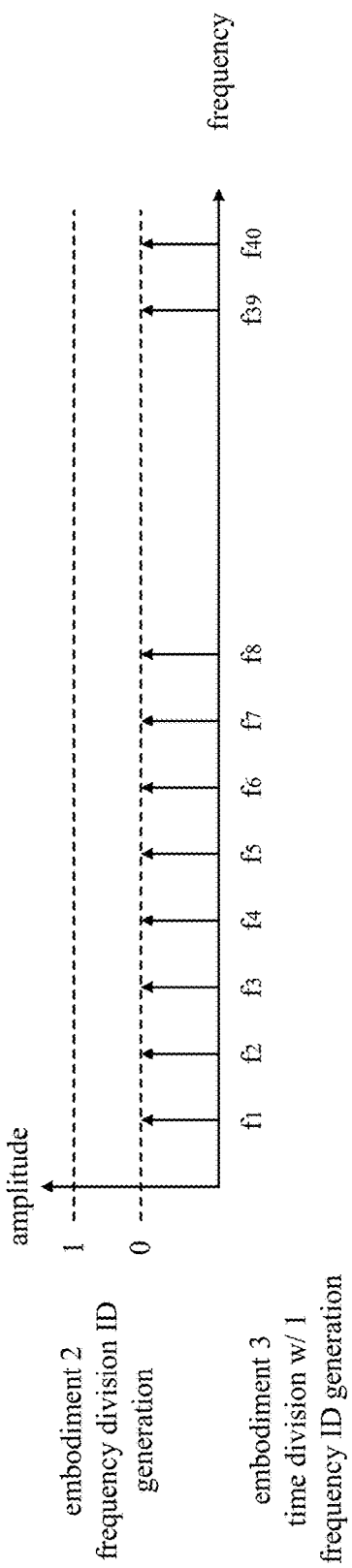

FIGS. 16A and 16B are diagrams illustrating the modulation of carrier signals to carry identification codes in accordance with embodiments of the present disclosure. FIG. 16A illustrates an embodiment in which 10 carriers (of unique frequencies) are employed in a time divided fashion to carry a 40 bit identifier. Thus, with the usage of 10 carriers, four time intervals are required to transmit the 40 bit identifier from an identifying device to the touch-sensitive panel of another device. FIG. 16B illustrates an embodiment in which 40 carries (of unique frequencies) are employed to carry a 40 bit identifier. Thus, with the usage of 40 carriers, the 40 bit identifier is transmitted in a single time interval from an identifying device to the touch-sensitive panel of another device.

Note that with the embodiments described herein, the information signal may include other components in a time divided fashion, such other components including a preamble, a synchronization component, a header, and a CRC check component, for example. In such case, the identifier would be considered the payload. The header may indicate a format of the payload, e.g., frequency modulated, time modulated, frequency/time modulated, bit length, encoding format, etc. The header may be transmitted on a single carrier frequency that is continuously scanned by the touch-sensitive panel and that is modulated in a particular format. With the header information received, the receiving device configures itself to receive the payload, which includes the identifier.

Figure 17:
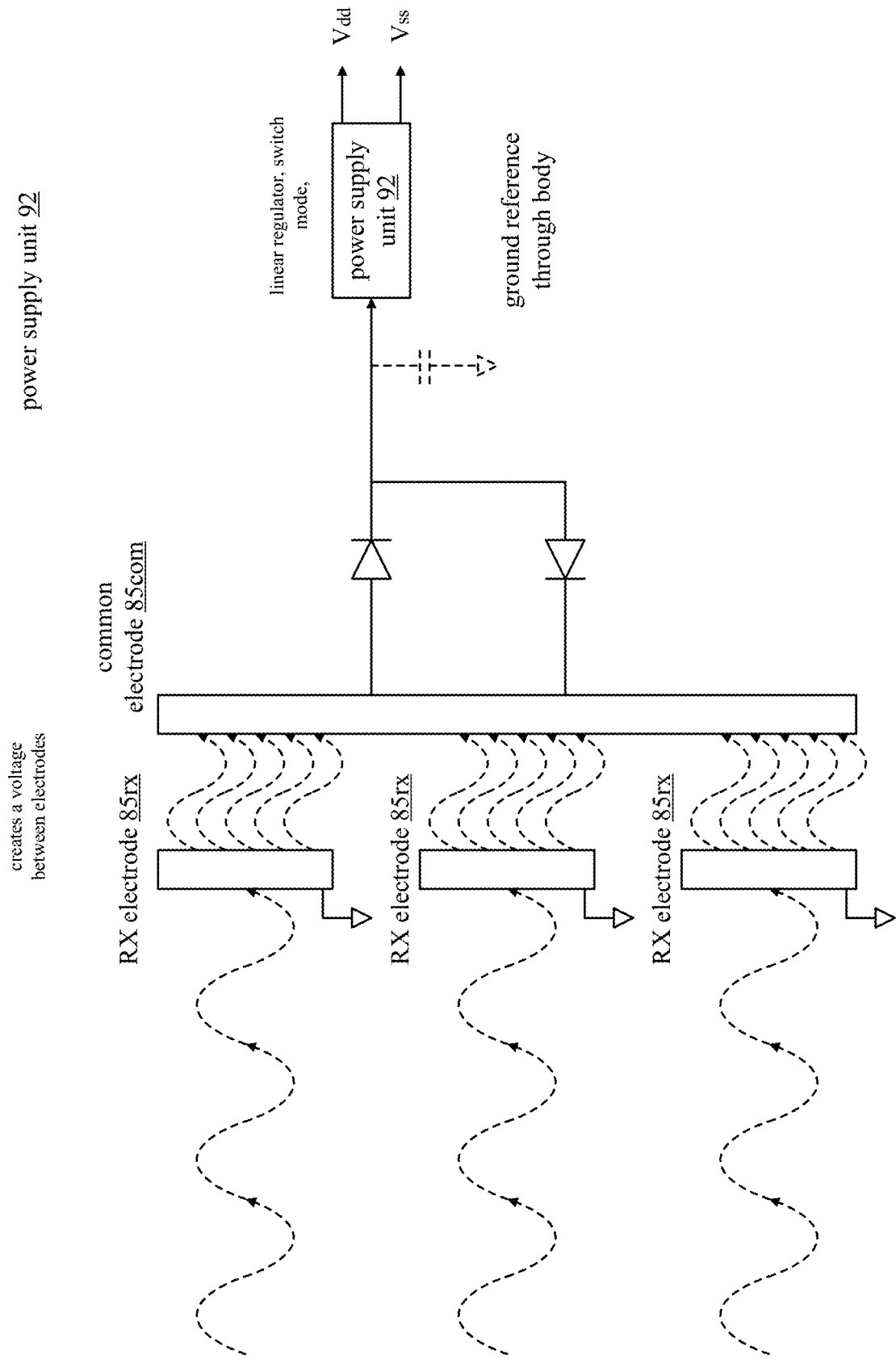
FIG. 17 is a diagram illustrating an identifying device harvesting power from electric fields generated by a touch-sensitive panel in accordance with embodiments of the present disclosure.

FIG. 17 is a diagram illustrating an identifying device harvesting power from electric fields generated by a touch-sensitive panel. Transmit electrodes 85t (FIGS. 9-11) can be used as RX electrodes $85_{RX}$ for power harvesting, while grounding electrodes 85g (FIGS. 9-11) can be used for common electrodes $85_{Com}$. In other implementations, different electrodes can be used for sensing and power harvesting. As illustrated by FIG. 17, a power signal received at the identifying device by the power supply unit 92 will create a voltage between RX electrode $85_{RX}$ and common electrode $85_{Com}$. Common electrode $85_{Com}$ is shown being coupled to a half-wave rectifier, which produces a half-wave rectified voltage that can be filtered and regulated by power supply unit 92 to provide power for the identifying device. A power supply unit 92 includes components that capture energy coupled to the various enabled electrodes, stores the energy, and provides the energy to power other components of the identifying device that does not have independent power, e.g., a battery.

FIG. 18 is a schematic block diagram of examples of digital data formats in accordance with embodiments of the present disclosure. As known, digital data is a string of binary values. A binary value is either a logic "1" or a logic "0". One binary value corresponds to a bit of the digital data. How the bits are organized into data words establishes the meaning for the data words. For example, American Standard Code for Information Interchange (ASCII) defines characters using 8-bits of data. For example, a capital "A" is represented as the binary value of 0100 0001 and a lower case "a" is represented as the binary value of 0110 0001.

A binary value can be expressed in a variety of forms. In a first example format, a logic "1" is expressed as a positive rail voltage for the duration of a 1-bit clock interval and logic "0" is expressed as a negative rail voltage for the duration of the 1-bit clock interval; or vice versa. The positive rail voltage refers to a positive supply voltage (e.g., Vdd) that is provided to a digital circuit (e.g., a circuit that processes and/or communicates digital data as binary values), the negative rail voltage refers to a negative supply voltage or ground (e.g., Vss) that is provided to the digital circuit, and the common mode voltage (e.g., Vcm) is half way between Vdd and Vss. The 1-bit clock interval corresponds to the inverse of a 1-bit data rate.

In a second example format, a logic "1" is expressed as a non-return to zero waveform that, for the first half of the 1-bit interval, is at the positive rail voltage (Vdd) and for the second half of the 1-bit interval is at the negative rail voltage (Vss). A logic "0" is expressed as a non-return to zero waveform that, for the first half of the 1-bit interval, is at the negative rail voltage (Vss) and for the second half of the 1-bit interval is at the positive rail voltage (Vdd). Alternatively, a logic "0" is expressed as a non-return to zero waveform that, for the first half of the 1-bit interval, is at the positive rail voltage (Vdd) and for the second half of the 1-bit interval is at the negative rail voltage (Vss). A logic "1" is expressed as a non-return to zero waveform that, for the first half of the 1-bit interval, is at the negative rail voltage (Vss) and for the second half of the 1-bit interval is at the positive rail voltage (Vdd).

In a third example format, a logic "1" is expressed as a return to zero waveform that, for the first half of the 1-bit interval, is at the positive rail voltage (Vdd) and for the second half of the 1-bit interval is at the common mode voltage (Vcm). A logic "0" is expressed as a return to zero waveform that, for the first half of the 1-bit interval, is at the negative rail voltage (Vss) and for the second half of the 1-bit interval is at the common mode voltage (Vcm). Alternatively, a logic "0" is expressed as a return to zero waveform that, for the first half of the 1-bit interval, is at the positive rail voltage (Vdd) and for the second half of the 1-bit interval is at the common mode voltage (Vcm). A logic "1" is expressed as a return to zero waveform that, for the first half of the 1-bit interval, is at the negative rail voltage (Vss) and for the second half of the 1-bit interval is at the common mode voltage (Vcm).

With any of the digital data formats, a logic value needs to be within 10% of a respective rail voltage to be considered in a steady data binary condition. For example, for format 1, a logic 1 is not assured until the voltage is at least 90% of the positive rail voltage (Vdd). As another example, for format 1, a logic 0 is not assured until the voltage is at most 10% of the negative rail voltage (Vss).

FIG. 19 is a functional diagram of an embodiment of an LVDC 26 in accordance with embodiments of the present disclosure. In a data transmission mode, the LVDC 26 functions to convert transmit (TX) digital data 190 into an analog transmit signal 196 in the form of an electric field that is sensed by a sense electric field generated by another device. In one example, where LVDC 26 is included in an identifying device, the transmit digital data 212 is referred to as an information signal that carries an identifier associated with the identifying device. In this example, the information signal is applied to an electrode to generate an electric field—the analog transmit signal 196 is capacitively coupled to an external device (not illustrated), and the external device senses the information signal and extracts the identifier encoded into the analog transmit signal 196.

In an example of a receive, or sensing mode, the transmit digital data 212 is a sinusoidal signal have a sensing frequency. In at least one embodiment, the sensing frequency is used as a reference frequency for a drive-sense circuit included in the LVDC, and allows the LDVC to identify changes in electrode impedance. The sinusoidal signal is applied to an electrode to generate analog TX signal 196, which is used as a sense electric field having a frequency corresponding to the sensing frequency, e.g. the reference frequency of the drive-sense circuit. Variations in the sense electric field caused by an analog receive (RX) signal are sensed to recover receive digital data 206. Note that an information signal, from the perspective of a sensing device, is referred to as an analog RX signal. The same signal, from the perspective of a transmitting device, is referred to as an analog TX signal.

In at least one embodiment, LDVC 26 is included in a touch-sensitive panel that includes multiple LDVCs. One or more of the LDVCs is configured to sense particular frequencies by applying reference signals with different frequencies to different drive-sense circuits included in the LDVCs. In some such embodiments, the information signal includes an identification code, and is made up of multiple different frequency components. Different LDVCs can used to concurrently sense different frequency components of the identifying signal, or different frequency components can be sensed sequentially, by sequentially applying reference signals of different frequencies to one or more LDVCs over time.

The analog RX signal 198 is converted to receive (RX) digital data 206 by one or more LDVCs 26. For implementations in which different frequency components of the information signal carry different portions of an identification code or other data to be recovered, received digital data from multiple LDVCs can be combined to extract the identification code from the information signal. In some embodiments, the presence of certain frequencies, or certain combinations of frequencies, may define the identification code carried by the information signal. In other embodiments, a spatial pattern, timing, or particular combination of frequencies, amplitudes, timing, and spatial patterns sensed by one or more LDVCs can be used to define the identification code.

Referring to transmit functionality, LVDC 26 receives the transmit digital data 212 from its host device and transmits the analog TX signal 196 to another LVDC capacitively coupled to LDVC 26. The analog TX signal includes a DC component 192 and an oscillating component 194. The oscillating component 194 includes data encoded into one or more channels of a frequency band. As an example, the transmit digital data is encoded into one channel, as such the oscillating component includes one frequency: the one corresponding to the channel. As another example, the transmit digital data is divided into x number of data streams. The LVDC encodes the x number of data streams on to x number of channels. Thus, the oscillating component 194 includes x number of frequencies corresponding to the x number of channels.

Referring to receive functionality, the LVDC 26 receives the analog RX signal 198 from another LVDC (e.g., the one it sent its analog TX signal to and/or another capacitively coupled LVDC. The analog RX signal 198 includes a DC component 193 and a receive oscillating component 195. The receive oscillating component 195 includes data encoded into one or more channels of a frequency band by the other LVDC and has a very low magnitude. The LVDC converts the analog RX signal 198 into the receive digital data 206, which it provides to its host device. Examples of a host device include an identifying device that may or may not include a touch-sensitive panel, a touchpad including a touch-sensitive panel, a laptop, a tablet, a smart phone, a display including a touch-sensitive panel, or any of the computing devices, wireless computing devices, servers, base stations, or wireless access points, illustrated in FIG. 1.

Figure 20:
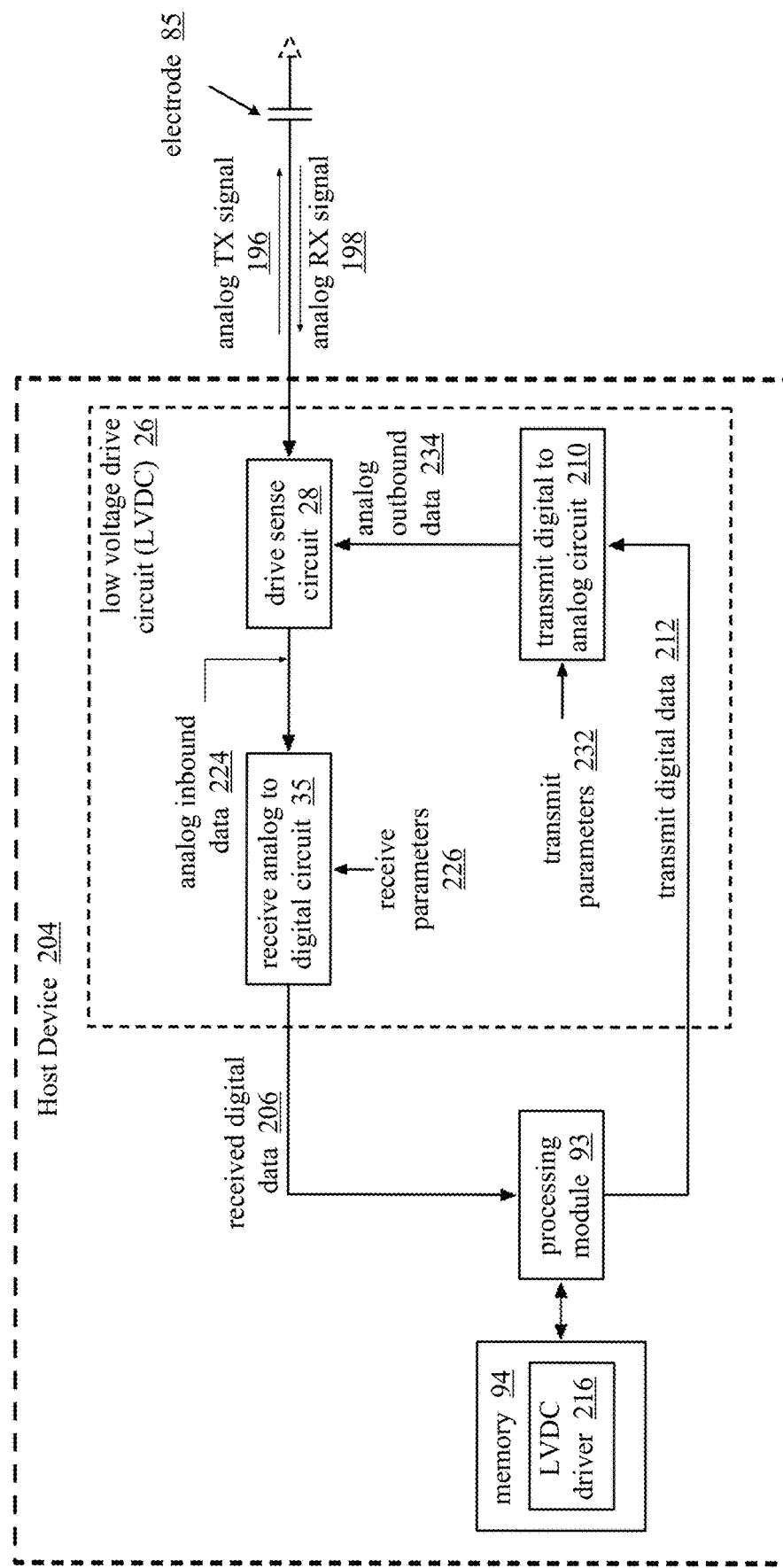
FIG. 20 is a schematic block diagram of an embodiment of an LVDC included in a host device in accordance with embodiments of the present disclosure.

FIG. 20 is a schematic block diagram of an embodiment of a Low Voltage Drive Circuit (LVDC) 26 included in a host device 204, and coupled to an electrode configured to capacitively couple host device 204 to another device. In implementations where host device 204 includes touch-sensitive panel, such as a touch-screen, the electrode is one of multiple row and column electrodes included in the touch screen. In implementations where LVDC is included in a transmit device, such as a FOB, ring, or other similar device, that lacks a touch-sensitive panel, the electrode may be one of a limited number of transmit electrodes, for example a single transmit electrode.

The host device 204 includes a processing module 93 and memory 94 (e.g., volatile memory and/or non-volatile memory). The memory 94 can store all or part of an LVDC driver 216 application in some implementations. Processing module 93 can be a general purpose processor, providing functionality similar to that provided by a mobile phone or laptop computer, or a specialty processor with limited capabilities. For example, where host device 204 is an identifying device that operates using harvested power, Processing module 93 may perform a limited number of hardcoded functions, memory 94 may include a pre-programmed identifier, LVDC 26 may include logic circuitry and fixed signal generation circuitry configured to provide transmission of a limited number of different identification codes, e.g. 1 or 2.

The LVDC 26 includes a drive sense circuit 28, a receive analog to digital converter (ADC) circuit 35, and a transmit digital to analog converter (DAC) circuit 210. In embodiments without sensing/receiving capability, receive analog digital circuitry 108 may be omitted.

In an example of operation, the processing module 104 of the host device 204 accesses the LVDC driver 216 to set up the LVDC 26 for operation. For example, the LVDC driver 216 includes operational instructions and parameters that enable the host device 204 to effectively use the LVDC for data communications. For example, the parameters include two or more of: one or more communication scheme parameters; one or more data conveyance scheme parameters; one or more receive parameters; and one or more transmit parameters. A communication scheme parameter is one of: independent communication (e.g., push data to other device without prompting from other device); dependent communication (e.g., push or pull data to or from other device with coordination between the devices); one to one communication; half duplex communication; and full duplex communication.

A data conveyance scheme parameter is one of: a data rate per line; a number of bits per data rate interval; data coding scheme per line and per number of bits per data rate interval; direct data communication; modulated data communication; power level of signaling; and voltage/current level for a data coding scheme.

A receive parameter includes one of: a digital data format for the received digital data; a packet format for the received digital data; analog to digital conversion scheme in accordance with parameter(s) of the communication scheme and of the data conveyance scheme of transmitted data by other LVDCs; and digital filtering parameters (e.g., bandwidth, slew rate, center frequency, digital filter coefficients, number of taps of digital filtering, stages of digital filtering, etc.).

A transmit parameter includes one of: a digital data format for the transmit digital data; transmission frequencies; frequency patterns; timing patterns; a packet format for the transmit digital data (if data packets are used); and digital to analog conversion in accordance with parameter(s) of the communication scheme and of the data conveyance scheme.

Once the LVDC 26 is set up for a particular data communication, the transmit DAC circuit 210 receives the transmit digital data 190 from its host device 204 in one of the formats of FIG. 18, or another format, and at a data rate of the host device (typically in the KHz range). If necessary, the transmit DAC circuit 210 converts the format of the transmit digital data 190 in accordance with one or more transmit parameters 232. In addition, the transmit DAC circuit 210 can synchronize the transmit digital data to produce a digital input of n-bits per time interval, where "n" is an integer greater than or equal to one.

The transmit DAC circuit 210 converts the digital input into analog outbound data 234 via a range limited digital to analog converter (DAC) and a DC reference source. The drive sense circuit 28 converts the analog outbound data 234 into the analog transmit signal 196 and drives it on to the electrode for capacitive coupling.

The drive sense circuit 28 receives the analog RX signal 198 and converts it into analog inbound data 224. The receive ADC circuit 108 converts the analog inbound data 224 into received digital data 206. The receive ADC circuit 108 filters the received digital data 206 in accordance with one or more receive parameters 226 to produce the filtered data. The receive ADC circuit 108 formats and packetizes the filtered data (as needed) in accordance with one or more receive parameters 226 to produce the received digital data 206. The receive ADC circuit 108 provides the received digital data 206 to Processing module 93.

Figure 21:
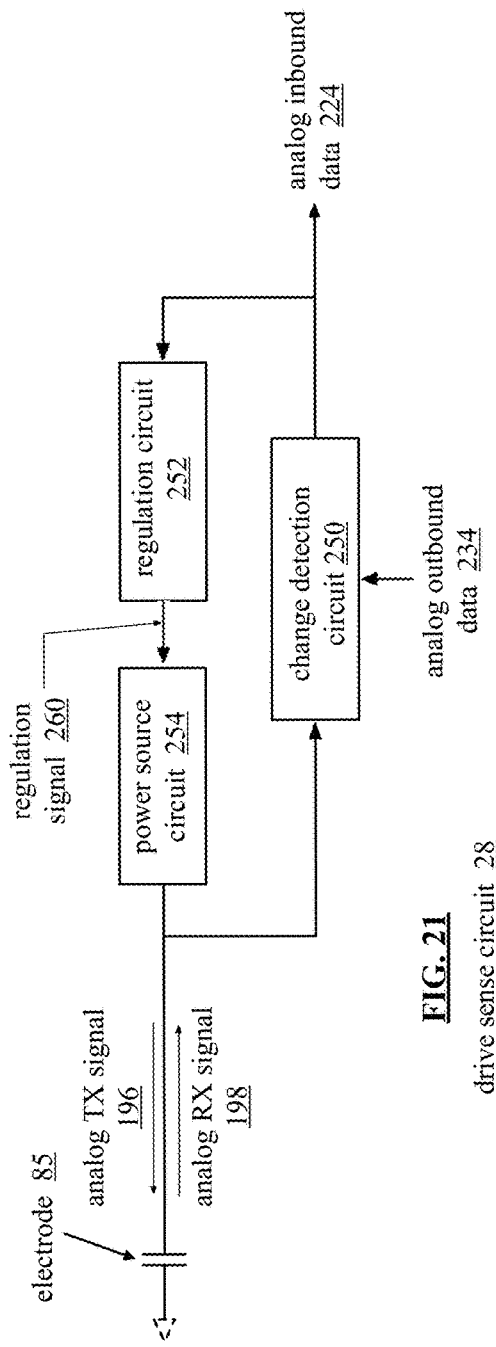
FIG. 21 is a schematic block diagram of an embodiment of a drive sense circuit of an LVDC coupled to a host device in accordance with in accordance with embodiments of the present disclosure.

FIG. 21 is a schematic block diagram of an embodiment of a drive sense circuit 28 of a Low Voltage Drive Circuit (LVDC) 26 coupled an electrode. The drive sense circuit 28 includes a change detection circuit 250, a regulation circuit 252, and a power source circuit 254.

The change detection circuit 250, the regulation circuit 252, and the power source circuit 254 operate in concert to keep the inputs of the change detection circuit 250 to substantially match (e.g., voltage to substantially match, current to substantially match, impedance to substantially match). The inputs to the change detection circuit 250 include the analog outbound data 234 and signals applied to the electrode (e.g., the analog RX signal 198 and the analog TX signal 196).

When there is no analog RX signal, the only signal applied to the electrode is the analog TX signal 196. The analog TX signal 196, is created by adjusting the operation of the change detection circuit 250, the regulation circuit 252, and the power source circuit 254 to match the analog outbound data 234. Since the transmit the analog TX signal 196 tracks the analog outbound data 234 within the drive sense circuit 28, when there is no analog RX signal 158, the analog circuit 250 224 is a DC value.

When an analog RX signal 198 is being received, the change detection circuit 250, the regulation circuit 252, and the power source circuit 254 continue to operate in concert to keep the inputs of the change detection circuit 250 to substantially match. With the presence of the analog RX signal 198, the output of the change detection circuit 250 will vary based on the analog RX signal 198, which produces the analog inbound data 224. The regulation circuit 252 converts the analog inbound data 224 into a regulation signal 260. The power source circuit 254 adjusts the generation of its output (e.g., a regulated voltage or a regulated current) based on the regulation signal 260 to keep the inputs of the change detection circuit 250 substantially matching.

According to another embodiment, and referring to at least of FIGS. 12, 15 and 16, among other Figures, an identifying device includes a power supply unit, at least one electrode, an identification frequency generator, and an identification driver circuit The identification frequency generator couples to the power supply unit and is configured to produce a modulated signal having at least one modulated carrier frequency component that carries a programmed ID corresponding to the device. The identification driver circuit couples to the power supply unit, to the identification frequency generator, and to the at least one electrode, the identification driver circuitry configured to convert the modulated signal to a transmit signal and to couple the transmit signal to the at least one electrode for capacitively coupling of the transmit signal to a touch-sensitive panel.

This embodiment includes multiple optional aspects. With one aspect, the at least one electrode is configured to capacitively couple to the touch-sensitive panel via a human body. With another aspect, the at least one electrode is configured to couple to at least one external conductor. With still another aspect, the power supply unit is configured to collect energy that is capacitively coupled to the at least one electrode. With this aspect, the energy that is capacitively coupled to the at least one electrode is in a first frequency band and the at least one frequency component is in a second frequency band that differs from the first frequency band.

With another aspect, the modulated signal includes a single carrier frequency component that is modulated over time to carry all bits of the programmed ID. With still another aspect, the modulated signal comprises a plurality of carrier frequency components, each of which is modulated to carry a single bit of the programmed ID. With yet another aspect, the modulated signal comprises a plurality of carrier frequency components, each of which is modulated over time to carry multiple bits of the programmed ID. With any of these embodiments, the device includes a substrate onto which the power supply unit, the at least one electrode, the identification frequency generator, and the identification driver circuitry are formed/mounted. Further, with any of these aspects, the device includes a housing in which the power supply unit, the at least one electrode, the identification frequency generator, and the identification driver circuitry are mounted.

According to another embodiment, further referring to previously described Figures, a device includes at least one electrode to at least one electrode configured to capacitively couple to a touch-sensitive panel, a power supply unit, an identification frequency generator, and an identification driver circuit. The power supply unit is configured to collect energy that is capacitively coupled to the at least one electrode from the touch-sensitive panel. The identification frequency generator couples to the power supply unit and is configured to produce a modulated signal having at least one modulated carrier frequency component that carries a programmed ID corresponding to the device. The identification driver circuit couples to the power supply unit, to the identification frequency generator, and to the at least one electrode, and is configured to convert the modulated signal to a transmit signal and to couple the transmit signal to the at least one electrode for capacitively coupling of the transmit signal to a touch-sensitive panel.

This embodiment includes a number of optional aspects. With one aspect, the at least one electrode is configured to capacitively couple to the touch-sensitive panel via a human body. With another aspect, the at least one electrode is configured to couple to at least one external conductor. With a further aspect, the energy that is capacitively coupled to the at least one electrode is in a first frequency band and the at least one frequency component is in a second frequency band that differs from the first frequency band.

With still another aspect, the modulated signal comprises a single carrier frequency component that is modulated over time to carry all bits of the programmed ID. Further, with another aspect, the modulated signal includes a plurality of carrier frequency components, each of which is modulated to carry a single bit of the programmed ID. With still another aspect, the modulated signal includes a plurality of carrier frequency components, each of which is modulated over time to carry multiple bits of the programmed ID. Other described aspects may also be included with either of these described embodiments.

Figure 22:
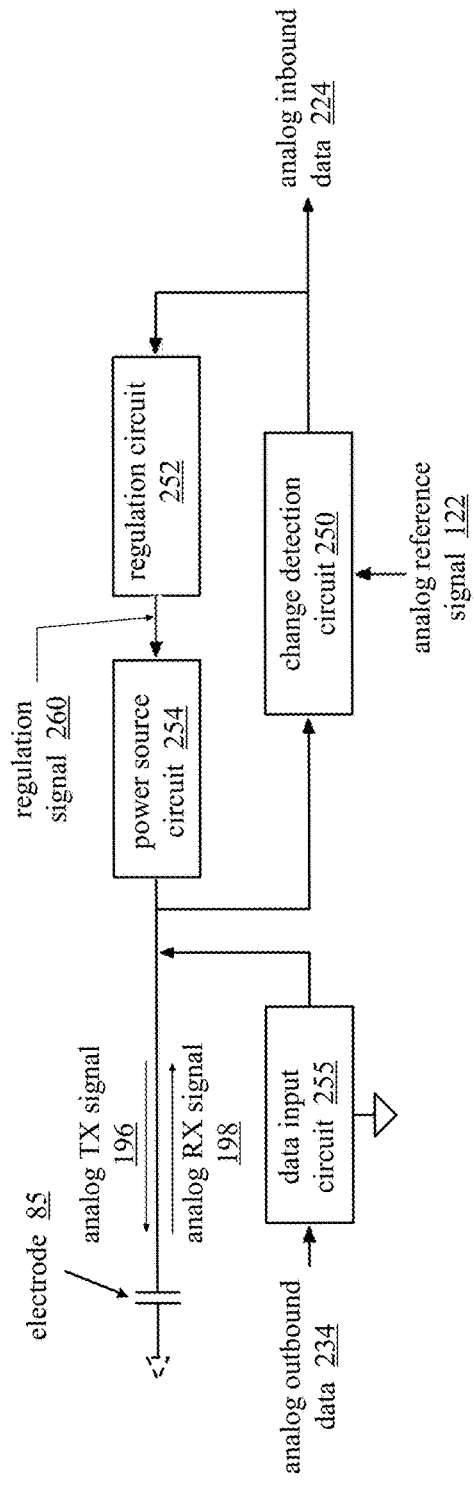
FIG. 22 is a schematic block diagram of another embodiment of a drive sense circuit of an LVDC coupled to a host device in accordance with in accordance with embodiments of the present disclosure.

FIG. 22 is a schematic block diagram of another embodiment of a drive sense circuit 28 of an LVDC 26 coupled to one or more electrodes. The drive sense circuit 28 includes the change detection circuit 250, the regulation circuit 252, the power source circuit 254, and a data input circuit 255. The change detection circuit 250, the regulation circuit 252, and the power source circuit 254 function as discussed with reference to FIG. 21 to keep the inputs of the change detection circuit 250 substantially matching. In this embodiment, however, the inputs to the change detection circuit 250 are the signals applied to the electrode (e.g., the analog TX signal 196 and the analog RX signal 198) and an analog reference signal 122 (e.g., a sinusoidal reference signal at a sensing frequency, a DC voltage reference signal or DC current reference signal). The analog outbound data 234 is inputted to the data input circuit 255.

The data input circuit 255 creates the analog TX signal 196 from the analog outbound data 234 and drives it on to the electrode. In an example, the data input circuit 255 causes an electric field generated by the electrode to vary based on the analog inbound data 224, thereby producing the analog TX signal 196.

Since the analog TX signal 196 is being created outside of the feedback loop of the change detection circuit 250, the regulation circuit 252, and the power source circuit 254, the analog inbound data 224 will include a component corresponding to the analog RX signal 198 and another component corresponding to the analog TX signal 196.

Figure 23:
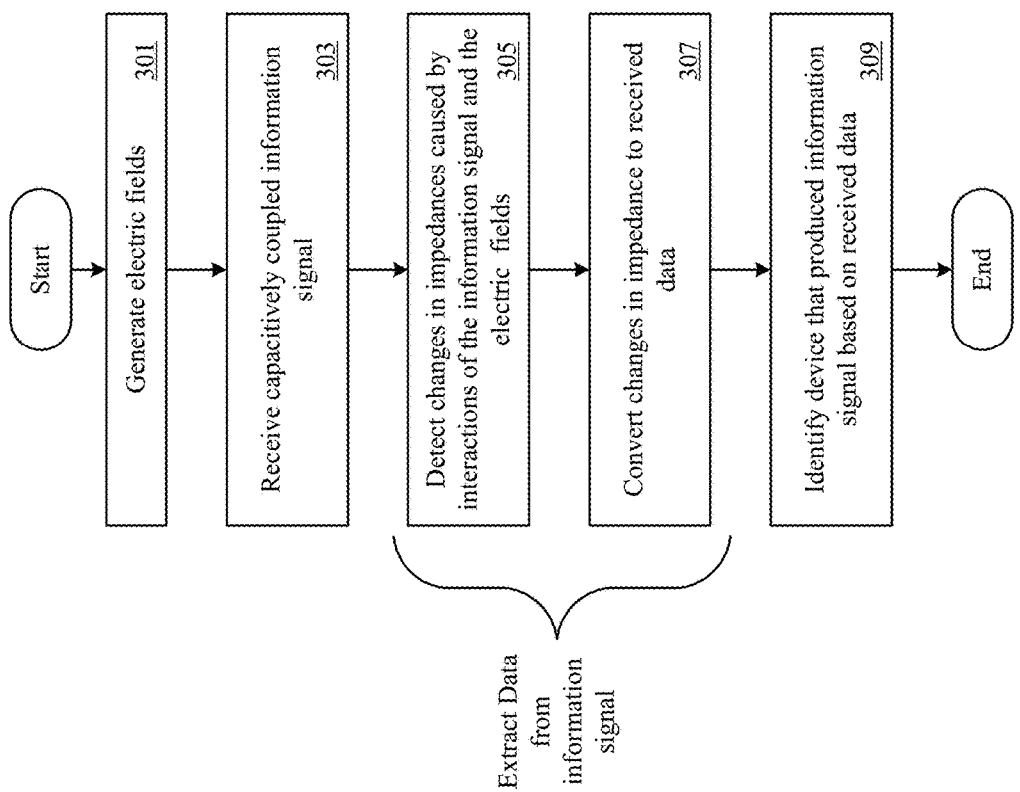
FIG. 23 is a flowchart illustrating a method used by a touch-sensitive panel to identify a device based on a capacitively coupled information signal in accordance with embodiments of the present disclosure.

FIG. 23 is a flowchart illustrating a method used by a touch-sensitive panel to identify a device based on a capacitively coupled information signal. As illustrated by block 301, the touch sensitive panel generates electric fields by applying reference signals at one or more desired frequencies to one or more drive-sense circuits. The drive-sense circuits couple the reference signals to electrodes, which generated sensing fields corresponding to reference signals.

As illustrated by block 303, the touch-sensitive panel receives a capacitively coupled information signal from an identifying device. The information signal can include one or more separate signals, each including one or more frequency components. The frequency components may be amplitude modulated.

As illustrated by blocks 305 and 307, data is extracted from the information signal. As shown by block 305, drive-sense circuits detect changes in electrode impedances caused by interactions of the information signal and the electric fields. As illustrated by block 307, an analog to digital converter, which may or may not be included in the drive-sense circuit, converts the detected impedance changes into digital data.

As illustrated by block 309, a processing module included in the touch-sensitive panel identifies the identifying device, e.g. the device that transmitted the information signal, based on the data extracted from the information signal. The identifying device can be identified using lookup tables or other data structures that link particular identifiers to particular devices, users, or the like. For example, data extracted from the information signal can be analyzed to identify patterns that correspond to particular identifiers, and then those particular identifiers can be linked to particular devices or users.

Figure 24:
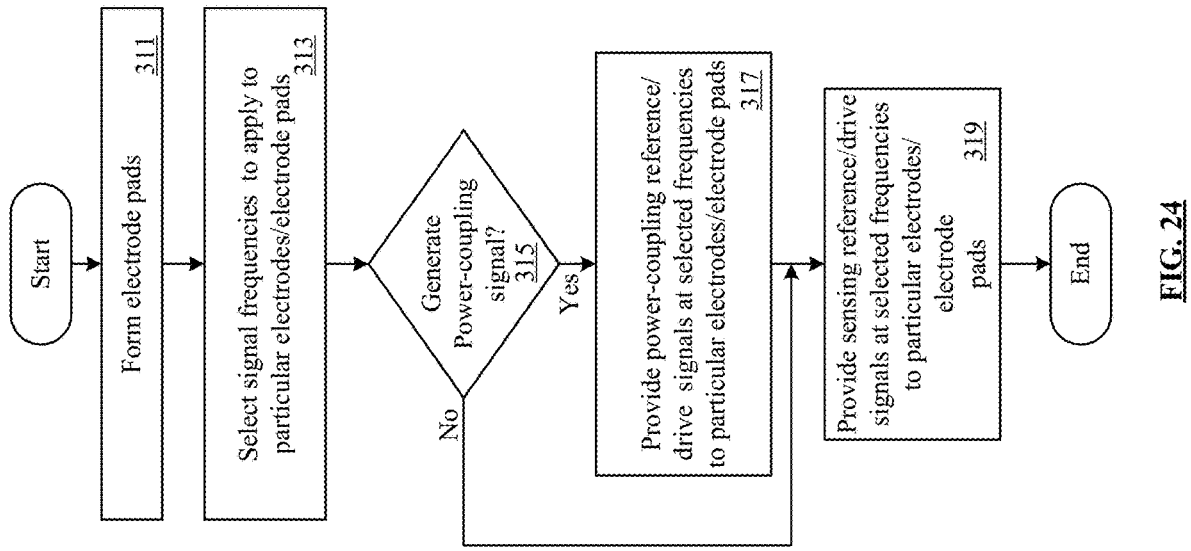
FIG. 24 is a flowchart illustrating a method of generating a power coupling signal by a touch-sensitive panel in accordance with embodiments of the present disclosure.

FIG. 24 is a flowchart illustrating a method of generating a power coupling signal by a touch-sensitive panel. As illustrated by block 311, one or more electrode pads for power transmission are formed. The electrode pads can be formed by coupling multiple row and/or column electrodes to a single drive-sense circuit using one or more switch networks, by coupling multiple electrodes together and to an output of a frequency generation circuit, or the like. Row and column electrodes in different parts of a touch-sensitive display may be used to provide exclusively power coupling signals, exclusively sensing signals, or exclusively transmit signals. Alternatively power-coupling signals can be interleaved or otherwise mixed with sensing and/or transmit signals across multiple areas of the touch-sensitive display.

As illustrated by block 313, frequency signals to be applied to particular electrodes or electrode pads are selected, and the information provided to a switch controller. The switch controller causes one or more switch networks to couple signals having selected frequencies to selected row and/or column electrodes.

As illustrated by blocks 315 and 317, if one of the selected frequencies is a power-coupling signal, a power-coupling reference or drive signal at a power-coupling frequency is provided to selected row and/or column electrodes individually, or to electrode pads formed using multiple row and/or column electrodes. As illustrated by blocks 315 and 319, if no power-coupling signal will be used, sensing reference/drive signals are provided to selected electrodes at the frequencies selected at block 313.

The decision at block 315 can be made based on capability data included in the information signal, by cross-referencing an identifier extracted from an information signal with information included in a device capabilities lookup table, or the like. For example, an identification code extracted from an information signal generated by a particular identifying device may be used to lookup stored information indicating the capabilities of that particular identifying device. Those capabilities can include information indicating whether the identifying device includes power-harvesting capabilities.

In some embodiments, the decision about whether to generate a power-coupling signal can be based on a type of identifying device. The type of identifying device can be determined, in some cases, based on the identifier itself (is it an older identifier or a newer identifier), based on frequency components or patterns included in the information signal, or the like. In yet other embodiments, the decision to generate a power-coupling system may depend on capabilities of the touch-sensitive panel.

FIG. 25 is a flowchart illustrating use of transmission patterns to extract an identification code from a capacitively coupled information signal. As illustrated by block 321, electric fields are generated by applying drive signals to row and column electrodes included in a touch-sensitive panel. As illustrated by block 323, an information signal capacitively coupled to the touch sensitive panel is sensed, e.g. by detecting changes in electrode impedance. As shown by block 325, the impedance changes are converted to received data by drive-sense circuits.

As illustrated by block 327, one or more transmission patterns associated with the sensed information signal are identified. For example, the information signal may include certain frequency, spatial, amplitude, and/or timing patterns. For example, an identifier to be extracted from an information signal may be represented by a pattern of repeating frequencies, by a pattern of varying amplitudes associated with certain frequencies, by a length of time a given pattern repeats before being varied, by varying a number of frequencies used to create the information signal, or the like. Data extracted from the information signal having a single frequency can include digital data modulated onto that single frequency to cause corresponding variations in an electric field that is capacitively coupled to a touch-sensitive panel.

As illustrated by block 329, the identified pattern can be recognized as an identifier or identification code by comparing the identified pattern to a list of known identifiers or identification codes. In some embodiments, the identified pattern can be used to positively identify the device transmitting the information signal based on characteristics of the identifier, such as a number of frequency components, a range of frequencies used, a type of pattern used, or the like.

FIG. 26 is a flowchart illustrating a method of capacitively communicating between an identifying device and a touch-sensitive panel. As illustrated by block 331, an identifying device can begin generating an information signal by generating an identification code that includes one or more frequencies, one or more frequency or other patterns, or the like. Generating the identification code includes, generating the signals used to construct the identification code. Assume, for example, that an identification code requires transmission of two signals having a first frequency and a second frequency, and each of those signals is required to encode the same 4-bit digital word. The identifying device will generate a first signal, having a first frequency, and amplitude modulate the first signal to include the 4-bit digital word. The signal strength of the first signal will be regulated, as illustrated by block 333, and the first regulated signal will be applied to a transmit electrode to generate a corresponding electrical field, as shown by block 335. As illustrated by block 337, the electric field corresponding to the first signal will be capacitively coupled to an external device, such as a touch-sensitive panel. The first signal may be transmitted for a predefined period of time, to ensure that the first signal can be recognized.

The identifying device will then generate a second signal, having a second frequency, and amplitude modulate the second signal to include the 4-bit digital word. The signal strength of the second signal will be regulated, and the second regulated signal will be applied to a transmit electrode to generate a corresponding electrical field. The electric field corresponding to the second signal will be capacitively coupled to an external device, such as a touch-sensitive panel. The second signal may be transmitted for a predefined period of time, to ensure that the second signal can be recognized. Upon receipt of the second signal, the touch-sensitive panel will recognize the pattern by matching it to a known identifier pattern.

In some embodiments, the first and second signal can be mixed, and applied to the transmit electrode concurrently. It will be appreciated that described set of signals concurrently may define a different identification code than the identification code defined by sequential transmission of those same signals.

Figure 27:
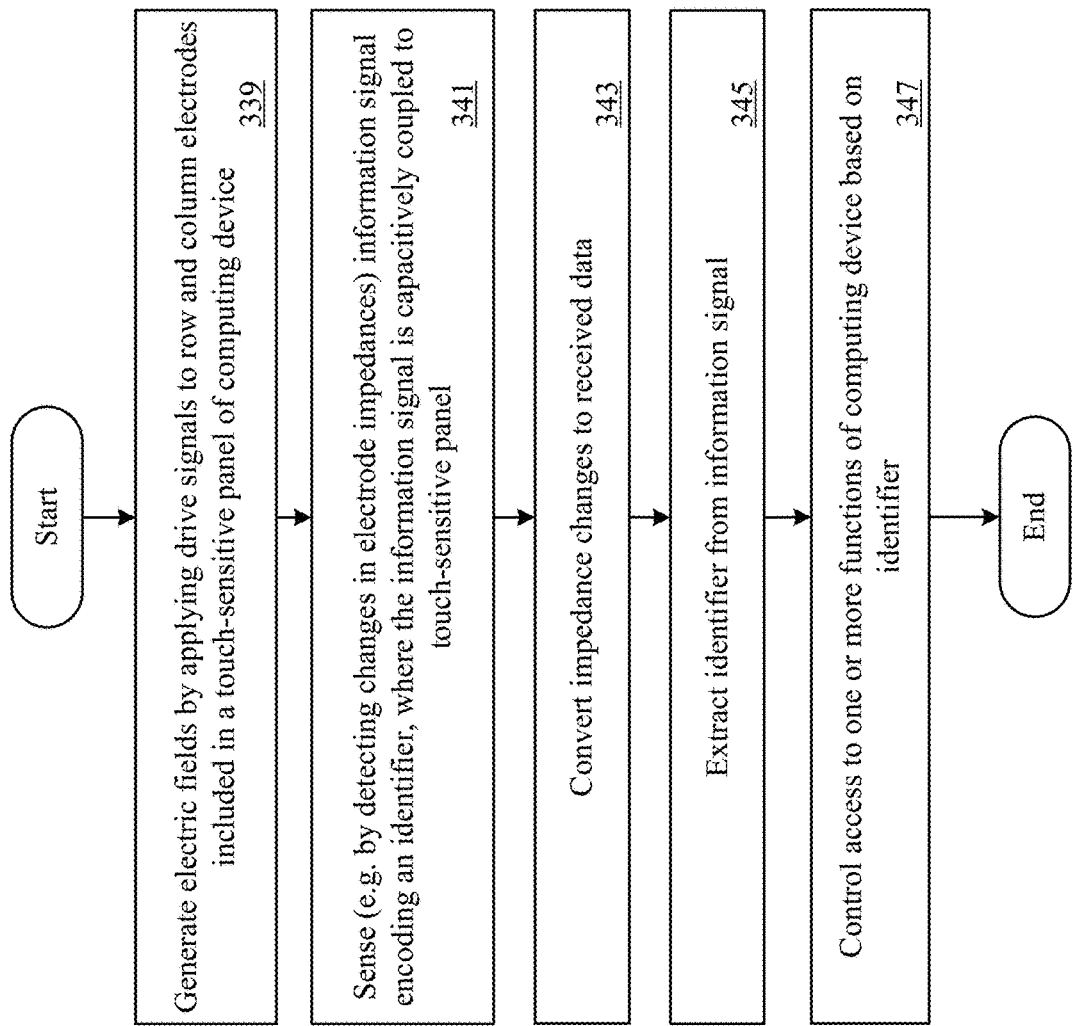
FIG. 27 is a flowchart illustrating a method of controlling access based on an identifier extracted from a capacitively-coupled information signal in accordance with embodiments of the present disclosure.

FIG. 27 is a flowchart illustrating a method of controlling access based on an identifier extracted from a capacitively-coupled information signal. As illustrated by block 339, electric fields are generated by applying drive signals to row and column electrodes included in a touch-sensitive panel of computing device. As illustrated by block 341, an information signal, which encodes an identifier, is capacitively coupled to the touch-sensitive panel. The information signal is sensed using changes in electrode impedances caused by the information signal. As illustrated by block 343, the impedance changes are converted to received data. The identifier is extracted/recovered from the information signal based on the received data, as illustrated by block 345.

As illustrated by block 347, access to one or more functions of a computing device are controlled based on the extracted identifier. Access to functions can include access to a network interface card included in the touch-sensitive panel, access to an application already executing on the touch-sensitive panel, access to functionality that allows launching a program or application, access to a mail, social media, or other communication platform accessible via the touch-sensitive panel. Functionality being controlled can include unlocking a door, turning on a light, starting or stopping a vehicle, booting or shutting down a computing device, dialing a phone number, activating an appliance, transmitting a stored file or password associated with the extracted identifier, automatically deleting a pre-designated file or set of files, access an encrypted hard drive, or the like.

Controlling access can include transmitting the extracted identifier to an external service, and allowing or denying access to a function based on a response from that service. Controlling access can also include receiving a request for access, and granting that request based on the extracted identifier. Controlling access can further include determining a time difference between receiving a request for access and receiving the information signal. Controlling access can also include automatically executing a function, without requiring any additional user action, in response to determining that the extracted identifier is valid. Controlling access can also include providing access to a financial account, automatically populating one or more fields in a computerized form.

Figure 28:
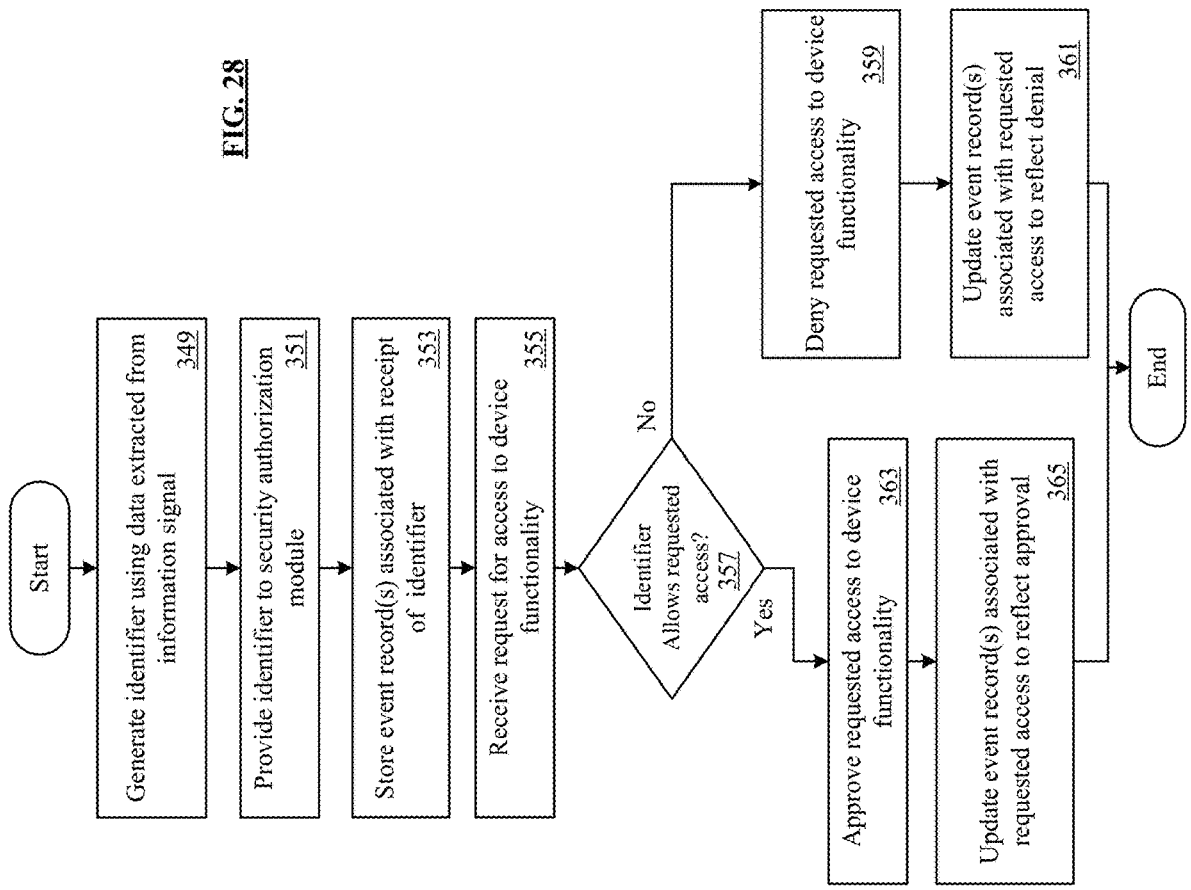
FIG. 28 is a flowchart illustrating another method of controlling access to requested functionality based on an identifier extracted from a capacitively-coupled information signal in accordance with embodiments of the present disclosure.

FIG. 28 is a flowchart illustrating another method of controlling access to requested functionality based on an identifier extracted from a capacitively-coupled information signal. As illustrated by block 349, an identifier is generated based on data extracted from a capacitively-coupled information signal. As illustrated by block 351, the identifier is provided to a security authorization module. As shown by block 353 an event record associated with receipt of the identifier is stored.

As illustrated by block 355, a request for access to device functionality is received. The request can be an internal request generated by a process running on the touch-sensitive display, or an external request receive via a communications interface included in the touch-sensitive display. As illustrated by block 357, a check is made to determine whether the identifier allows access to the requested functionality. For example, if access to particular file is requested, a list indicating identifiers that are allowed access to the function. In other embodiments the security authorization module can transmit the identifier to an external service, such as an active directory service, that makes the access determination and informs the security authorization module of its decision.

As illustrated by block 359, if the identifier does not provide authorization to access the requested functionality, the security authorization module denies the access, and generates (or updates) an event record including information about the access request, the identifier, and the denial of access, as illustrated by block 361. In some embodiments denying access can include denying access to all or part of a process, file, application, device, or the like.

As illustrated by block 363, if the identifier is sufficient to provide authorization to access the requested functionality, the security authorization module grants the access, and generates (or updates) an event record including information about the access request, the identifier, and the access grant, as illustrated by block 365. Granting access can include transmitting an authorization message to an application or process associated with the requested functionality. In some embodiments granting access can include granting full access, or only partial access.

Figure 29:
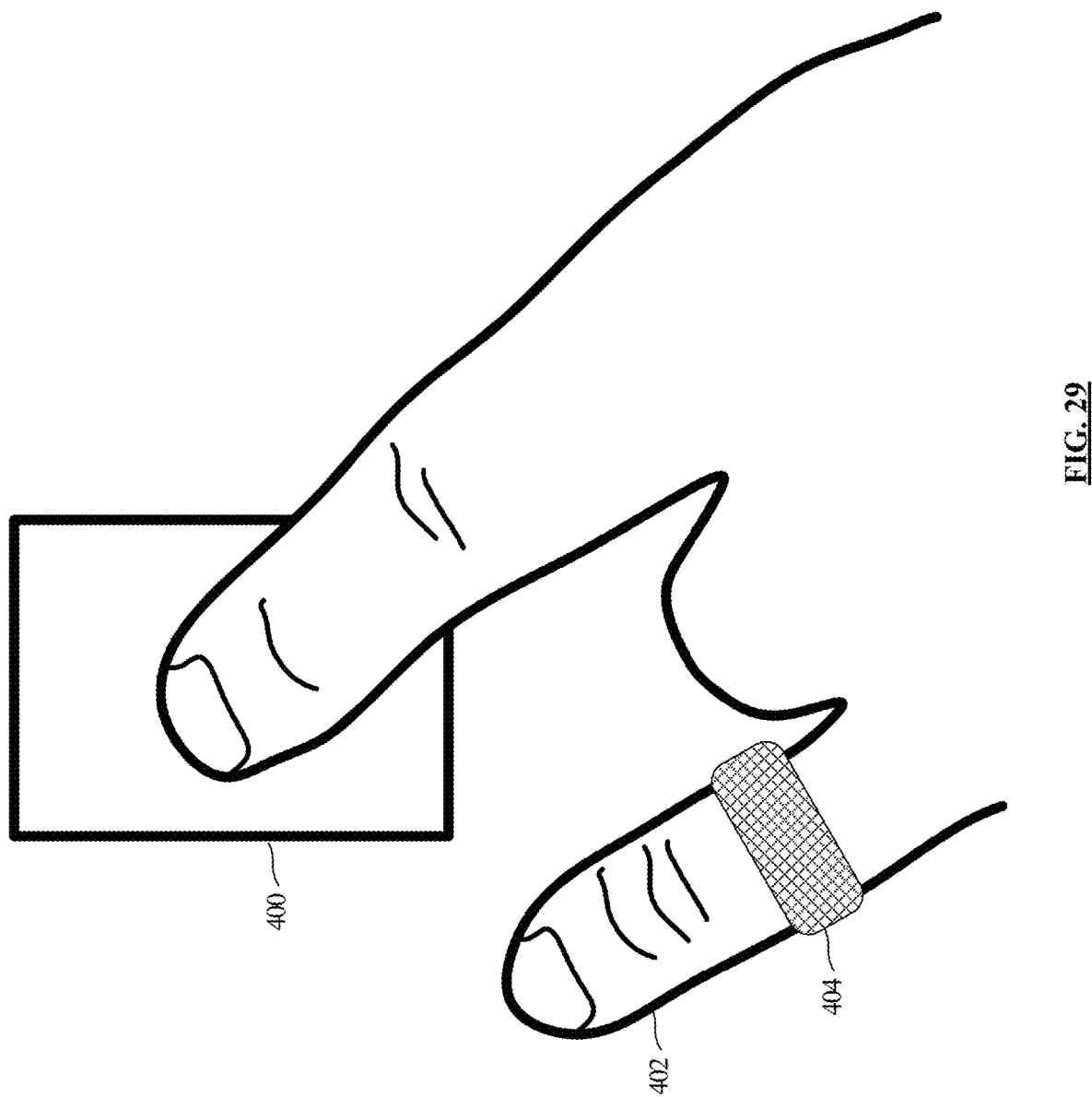
FIG. 29 is a diagram illustrating a hand of a user on which an identifying device in the form of a ring is located and another finger of the hand contacting a touch-sensitive panel in accordance with embodiments of the present disclosure.

FIG. 29 is a diagram illustrating a hand of a user on which an identifying device in the form of a ring is located and another finger of the hand contacting a touch-sensitive panel in accordance with embodiments of the present disclosure. The identifying device 404 is worn on the hand 402 of a user and couples the identifier to a touch-sensitive panel 400 in accordance with the structure(s) and operation(s) previously described herein. With this illustration, the information signal produced by the identifying device 404 is capacitively coupled via the hand 402 of the user to the touch-sensitive panel 400. In various operations, the information signal may be coupled to the touch-sensitive panel 400 without an actual touch by hand 402 on touch-sensitive panel 400. In such case, sufficient capacitive coupling exists between the hand 402 and the touch-sensitive panel 400 without a touch to support transmission of the information signal from the identifying device 404, through the hand 402, to the touch-sensitive panel 400.

In one use case, the identifier is used to authenticate a user for access to equipment, to restricted access spaces, and/or for other authentication purposes. In another use case, the identifier is simply used to provide evidence of the user proximate the touch-sensitive panel 400. In a package delivery example, the touch-sensitive panel 400 may be located proximate a door of a dwelling and the identifier provides proof that the user was present at a particular time, and perhaps for a particular purpose. As will be described further with reference to FIGS. 30 and 31, the user's presence may be used for package delivery or other delivery proof. Because the identifier is employed to identify a particular individual, which may work for a particular service company, e.g., package delivery company, receipt of the identifier by the touch-sensitive panel 400, touching of the user's hand 402 to the touch-sensitive panel and relaying of the identifier evidences the user's presence at a particular time.

Figure 30:
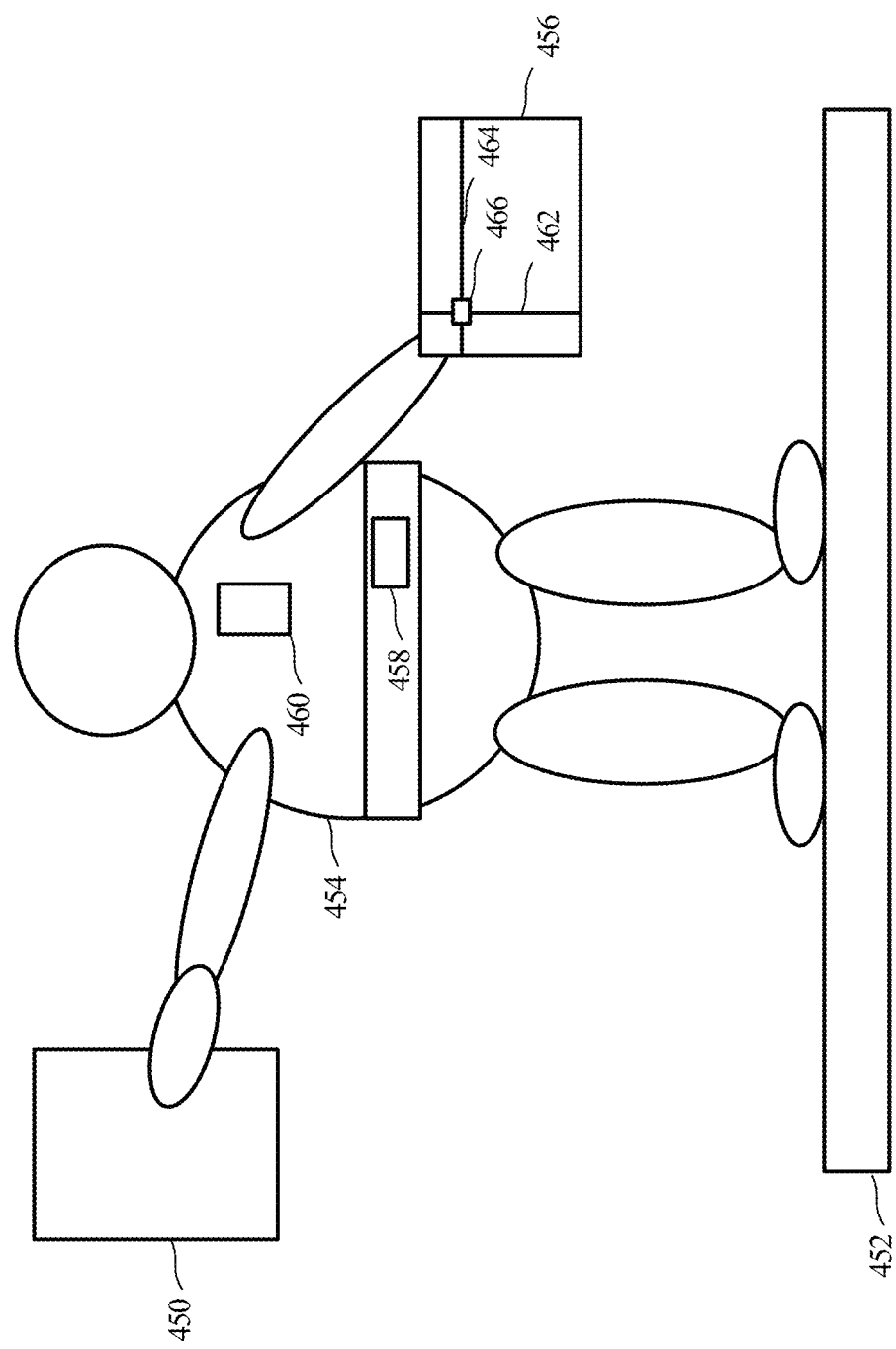
FIG. 30 is a diagram illustrating a package delivery system in accordance with embodiments of the present disclosure.

FIG. 30 is a diagram illustrating a package delivery system in accordance with embodiments of the present disclosure. With this embodiment, a delivery person 454 delivers package 456 to location, e.g., home, office, warehouse, etc. The location includes touch-sensitive panel 450 that receives information regarding the delivery person 454 and/or package 456. Structure 452, which may be a door mat, electrode structure, or another structure may also be present to couple information signals. An identifying device 458 or 458 is worn by the user 454 and conveys an identifier to the touch-sensitive panel 450. The structure and operation of the equivalent circuitry and devices for supporting communication of information signals illustrated in FIG. 30 is consistent with that previously described herein.

The package 456 may also include an identifying device 466 that is operable to convey a corresponding identifier to the touch-sensitive panel 450 via the body of the delivery person 454. As an example of operation, the package 456 has a unique identifier, which is conveyed to the touch-sensitive panel 450. The touch-sensitive panel 450 is coupled to a communication infrastructure and conveys received information, which may be further used to confirm delivery of the package 456. Conveying information via the structure 452 may be performed similarly/consistently with conveying information via touch-sensitive panel 450. The identifying device 466 may couple to electrodes 462 and/or 464, which increases capacitive coupling between the identifying device 466 and the touch-sensitive panel for energy collection and information signal communication purposes.

Figure 31:
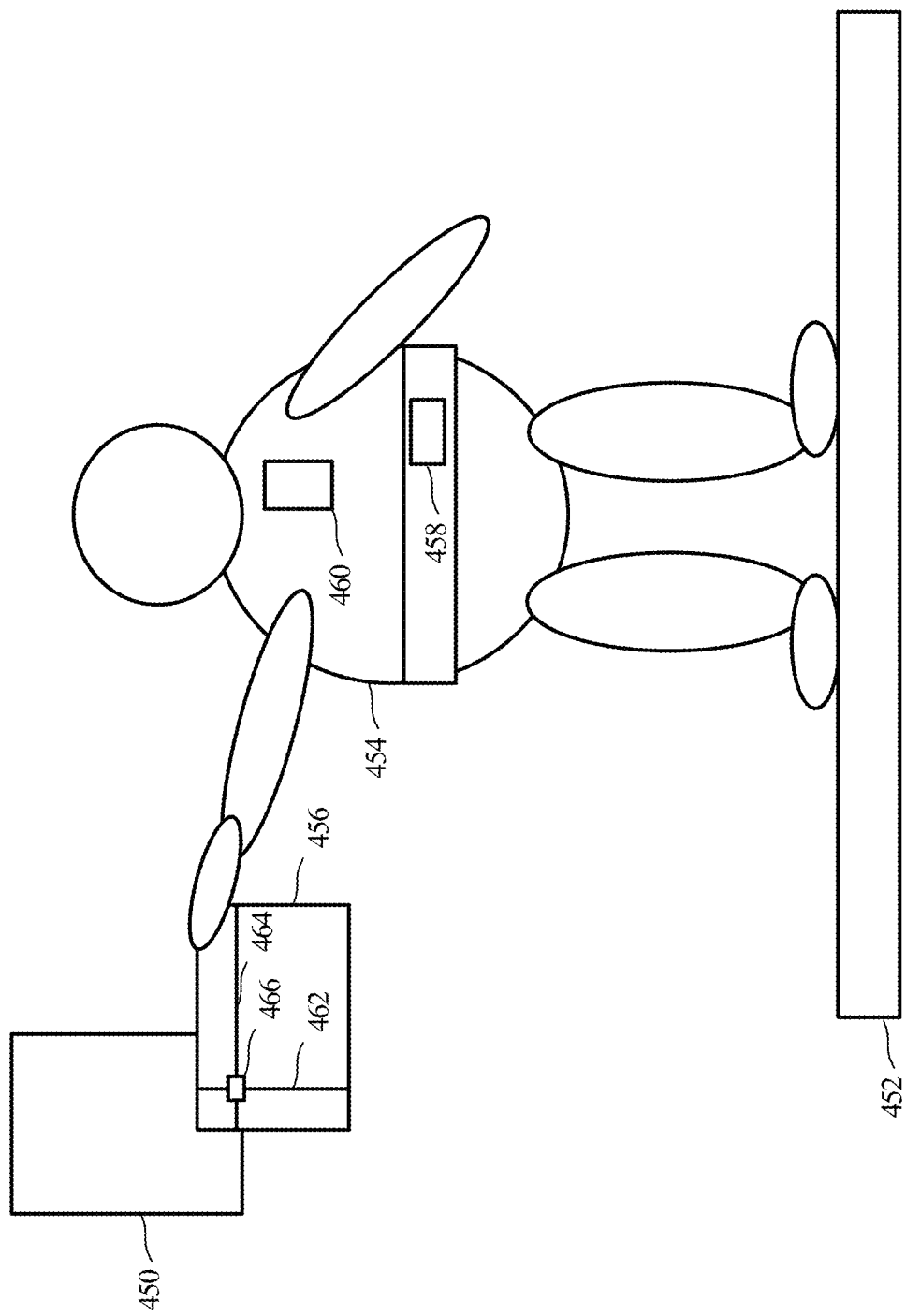
FIG. 31 is a diagram illustrating a package delivery system in accordance with embodiments of the present disclosure.

FIG. 31 is a diagram illustrating a package delivery system in accordance with embodiments of the present disclosure. The structure and operations illustrated in FIG. 31 is similar/same to that of FIG. 30. However, with FIG. 31, the delivery person 454 holds the package near touch-sensitive panel 450 and information is conveyed directly from identifying device 466.

Figure 32:
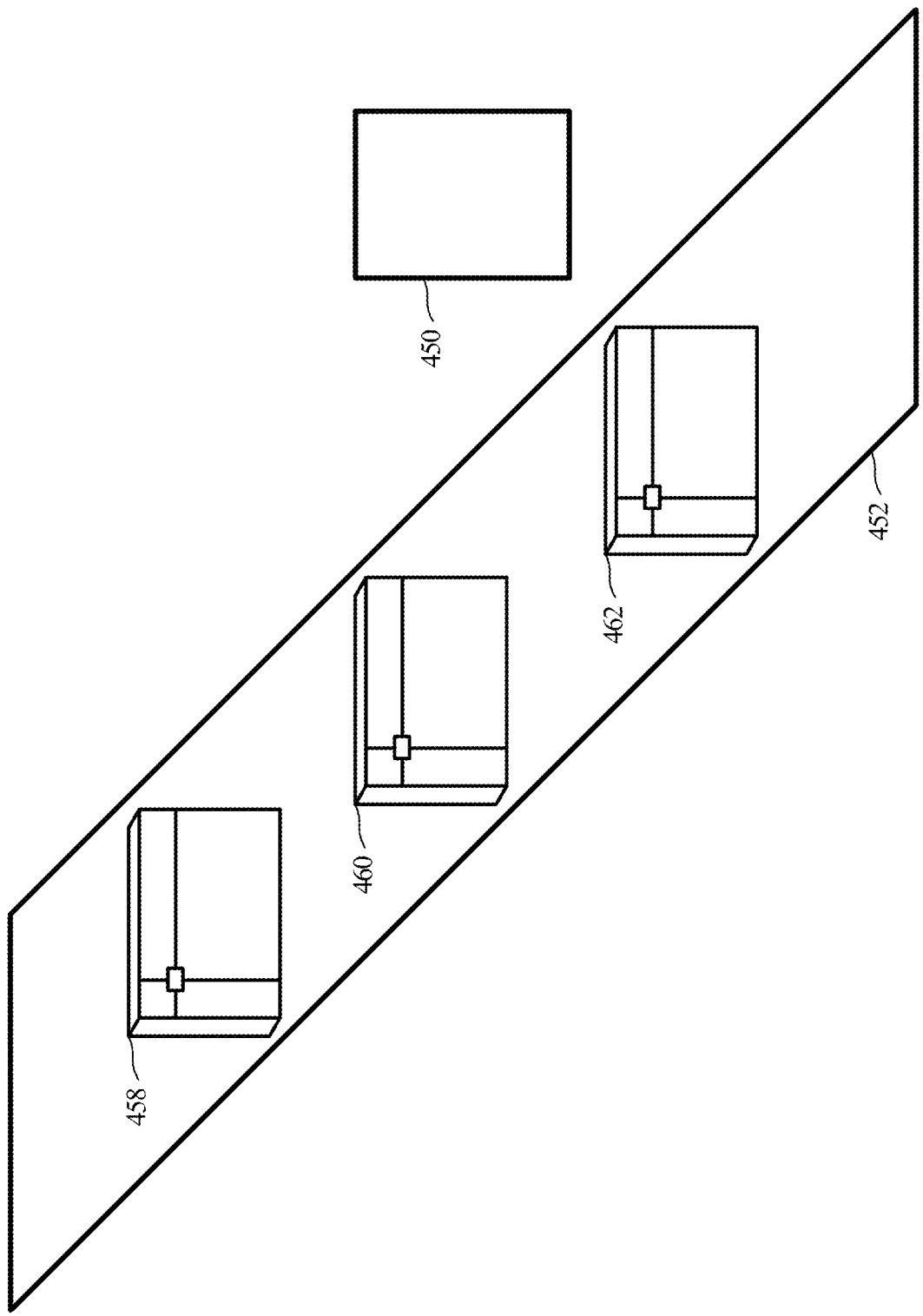
FIG. 32 is a diagram illustrating a package identification system in accordance with embodiments of the present disclosure.

FIG. 32 is a diagram illustrating a package identification system in accordance with embodiments of the present disclosure. With the system of FIG. 32, packages 458, 460, and 462 are carried by conveyer belt as they pass touch-sensitive panel 450. Each of the packages includes an identifying device that capacitively couples to the touch-sensitive panel 450 and transmits respective information signals to identify the package. The structures and operations previously described herein support communications of this system.

It is noted that terminologies as may be used herein such as bit stream, stream, signal sequence, etc. (or their equivalents) have been used interchangeably to describe digital information whose content corresponds to any of a number of desired types (e.g., data, video, speech, text, graphics, audio, etc. any of which may generally be referred to as 'data'). A touch-sensitive pad referred to herein may also be referred to as a touch-sensitive panel and vice versa. These terms are used interchangeably herein to refer to a structure that senses touch and that may also be used to transmit and/or receive information signals as described herein.

As may be used herein, the terms "substantially" and "approximately" provide an industry-accepted tolerance for its corresponding term and/or relativity between items. For some industries, an industry-accepted tolerance is less than one percent and, for other industries, the industry-accepted tolerance is 10 percent or more. Other examples of industry-accepted tolerance range from less than one percent to fifty percent. Industry-accepted tolerances correspond to, but are not limited to, component values, integrated circuit process variations, temperature variations, rise and fall times, thermal noise, dimensions, signaling errors, dropped packets, temperatures, pressures, material compositions, and/or performance metrics. Within an industry, tolerance variances of accepted tolerances may be more or less than a percentage level (e.g., dimension tolerance of less than +/−1%). Some relativity between items may range from a difference of less than a percentage level to a few percent. Other relativity between items may range from a difference of a few percent to magnitude of differences.

As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to".

As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may be used herein, one or more claims may include, in a specific form of this generic form, the phrase "at least one of a, b, and c" or of this generic form "at least one of a, b, or c", with more or less elements than "a", "b", and "c". In either phrasing, the phrases are to be interpreted identically. In particular, "at least one of a, b, and c" is equivalent to "at least one of a, b, or c" and shall mean a, b, and/or c. As an example, it means: "a" only, "b" only, "c" only, "a" and "b", "a" and "c", "b" and "c", and/or "a", "b", and "c".

As may also be used herein, the terms "processing module", "processing circuit", "processor", "processing circuitry", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, processing circuitry, and/or processing unit may be, or further include memory and/or an integrated memory element, which may be a single memory device, a plurality of memory devices, and/or embedded circuitry of another processing module, module, processing circuit, processing circuitry, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, processing circuitry, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, processing circuitry and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, processing circuitry and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with one or more other routines. In addition, a flow diagram may include an "end" and/or "continue" indication. The "end" and/or "continue" indications reflect that the steps presented can end as described and shown or optionally be incorporated in or otherwise used in conjunction with one or more other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

While the transistors in the above described figure(s) is/are shown as field effect transistors (FETs), as one of ordinary skill in the art will appreciate, the transistors may be implemented using any type of transistor structure including, but not limited to, bipolar, metal oxide semiconductor field effect transistors (MOSFET), N-well transistors, P-well transistors, enhancement mode, depletion mode, and zero voltage threshold (VT) transistors.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid-state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A touch-sensitive panel, comprising:
a plurality of row electrodes;

a plurality of column electrodes;
a plurality of drive-sense circuits coupled to the plurality of row electrodes and the plurality of column electrodes, and configured to detect changes in impedances of the plurality of row electrodes and the plurality of column electrodes;
a plurality of analog-to-digital converters coupled to outputs of the drive-sense circuits;
a processing module coupled to the plurality of drive-sense circuits via the plurality of analog-to-digital converters, the processing module, the analog-to-digital converters, and the plurality of drive-sense circuits configured to:
sense an information signal capacitively coupled to the plurality of row electrodes and the plurality of column electrodes, wherein the information signal includes modulated data wherein the modulated data includes a plurality of frequency components representing an identification code;
extract the modulated data from the information signal, and
identify a device that produced the information signal based on the identification code.

2. The touch-sensitive panel of claim 1, further comprising:
at least one switch network coupled to the plurality of row electrodes, the plurality of column electrodes, and to the plurality of drive-sense circuits; and
a switch controller coupled to the at least one switch network, and configured to control the at least one switch network to electrically couple particular electrodes to particular drive-sense circuits.

3. The touch-sensitive panel of claim 2, wherein the switch controller is further configured to:
control the at least one switch network to electrically couple a plurality of electrodes to a single drive-sense circuit to form an electrode pad.

4. The touch-sensitive panel of claim 3, wherein the switch controller is further configured to control the at least one switch network to:
electrically couple a first number of electrodes per drive-sense circuit in a first portion of the touch-sensitive panel; and
electrically couple a second number of electrodes per drive-sense circuit in a second portion of the touch-sensitive panel.

5. The touch-sensitive panel of claim 1, further comprising:
at least one frequency generation module coupled to the plurality of drive-sense circuits, wherein the at least one frequency generation module is configured to provide different reference frequencies to different drive-sense circuits.

6. The touch-sensitive panel of claim 5, wherein the at least one frequency generation module is further configured to:
provide a power-coupling reference signal having a first frequency to a first group of one or more drive-sense circuits, wherein the power-coupling reference signal generates an electric field that supplies power to a capacitively coupled identifying device; and
provide a sensing reference signal having a second frequency to a second group of one or more drive-sense circuits, wherein the sensing reference signal is used for sensing the information signal.

7. The touch-sensitive panel of claim 1, wherein the processing module is further configured to:
identify the device that produced the information signal based on at least one of a frequency pattern of the information signal, an amplitude pattern of the information signal, a timing pattern of the information signal, or a spatial pattern of the information signal.

8. A touch-sensitive panel comprising:
a processing module;
a plurality of electrodes including one or more row electrodes and one or more column electrodes;
low voltage drive circuits (LVDCs) having inputs and outputs, wherein the inputs are coupled to the plurality of electrodes, and the outputs are coupled to the processing module, and wherein individual LVDCs include at least one drive-sense circuit and at least one analog-to-digital converter configured to:
sense an information signal capacitively coupled to one or more electrodes of the plurality of electrodes by detecting changes in impedance;
generate sensed signals at outputs of the LVDCs based on the changes in the impedance;
the processing module configured to:
receive the sensed signals; and
recover an identification code from the information signal using the sensed signals, wherein the identification code is represented by a transmission pattern associated with the sensed signals.

9. The touch-sensitive panel of claim 8, further comprising:
at least one switch network coupled to the plurality of electrodes and to the LVDCs; and
a switch controller coupled to the at least one switch network, and configured to control the at least one switch network to electrically couple particular electrodes to particular drive sense circuits included in the LVDCs.

10. The touch-sensitive panel of claim 9, wherein the switch controller is further configured to:
control the at least one switch network to electrically couple a plurality of electrodes to a single drive-sense circuit to form an electrode pad.

11. The touch-sensitive panel of claim 10, wherein the switch controller is further configured to control the at least one switch network to:
electrically couple a first number of electrodes per drive-sense circuit in a first portion of the touch-sensitive panel; and
electrically couple a second number of electrodes per drive-sense circuit in a second portion of the touch-sensitive panel.

12. The touch-sensitive panel of claim 8, further comprising:
at least one frequency generation module coupled to drive-sense circuits included in the LVDCs, wherein the at least one frequency generation module is configured to provide different reference frequencies to different drive-sense circuits.

13. The touch-sensitive panel of claim 12, wherein the at least one frequency generation module is further configured to:
provide a power-coupling reference signal having a first frequency to a first group of one or more drive-sense circuits, wherein the power-coupling reference signal generates an electric field that supplies power to a capacitively coupled identifying device; and
provide a sensing reference signal having a second frequency to a second group of one or more drive-sense circuits, wherein the sensing reference signal is used for sensing the information signal.

14. The touch-sensitive panel of claim 8, wherein the processing module is further configured to:
recover the identification code based on at least one of a frequency pattern of the information signal, an amplitude pattern of the information signal, a timing pattern of the information signal, or a spatial pattern of the information signal.

15. A method comprising:
generating electric fields by applying drive signals to a plurality of row electrodes and a plurality of column electrodes included in a touch-sensitive panel;
receiving an information signal including a transmission pattern, wherein the information signal is capacitively coupled to the plurality of row electrodes and the plurality of column electrodes, and wherein the information signal interacts with the electric fields;
extracting data from the information signal including the transmission pattern to determine an identification code represented by the transmission pattern, wherein extracting the data includes:
detecting changes in impedances caused by interactions of the information signal including the transmission pattern and the electric fields; and
converting the changes in the impedances to received data; and
identifying a device that produced the information signal including the transmission pattern based on the identification code.

16. The method of claim 15, further comprising:
controlling at least one switch network to electrically couple a plurality of electrodes to form an electrode pad.

17. The method of claim 16, further comprising:
controlling the at least one switch network to form a first electrode pad having a first size in a first portion of the touch-sensitive panel; and
controlling the at least one switch network to form a second electrode pad having a second size in a second portion of the touch-sensitive panel.

18. The method of claim 15, further comprising:
providing drive signals having different frequencies to different electrodes of the plurality of row electrodes and the plurality of column electrodes.

19. The method of claim 18, further comprising:
providing a power-coupling drive signal having a first frequency to a first group of electrodes, wherein the power-coupling drive signal generates an electric field that supplies power to a capacitively coupled identifying device; and
providing a sensing drive signal having a second frequency to a second group of electrodes, wherein the sensing drive signal is used for sensing the information signal including the transmission pattern.

20. The method of claim 15, further comprising:
identify the device that produced the information signal based on at least one of a frequency pattern of the information signal including the transmission pattern, an amplitude pattern of the information signal including the transmission pattern, a timing pattern of the information signal including the transmission pattern, or a spatial pattern of the information signal including the transmission pattern.

* * * * *